US012589675B2

(12) United States Patent
Lee et al.

(10) Patent No.: US 12,589,675 B2
(45) Date of Patent: Mar. 31, 2026

(54) FUEL CELL VEHICLE

(71) Applicants: Hyundai Motor Company, Seoul (KR); Kia Corporation, Seoul (KR)

(72) Inventors: Woo Young Lee, Yongin (KR); Ju Han Kim, Yongin (KR); Yoon Tae Kim, Seongnam (KR); Sae Kwon Chang, Yongin (KR); Tae Woo Ryu, Pohang (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 281 days.

(21) Appl. No.: 18/315,767

(22) Filed: May 11, 2023

(65) Prior Publication Data

US 2024/0051433 A1     Feb. 15, 2024

(30) Foreign Application Priority Data

Aug. 12, 2022     (KR) ........................ 10-2022-0101405

(51) Int. Cl.
| *B60L 58/40* | (2019.01) |
| *B60L 1/00* | (2006.01) |
| *B60L 50/75* | (2019.01) |
| *H01M 16/00* | (2006.01) |
| *H02J 7/34* | (2006.01) |

(52) U.S. Cl.
CPC .............. *B60L 58/40* (2019.02); *B60L 1/003* (2013.01); *B60L 50/75* (2019.02); *H01M 16/006* (2013.01); *H02J 7/342* (2020.01); *H02J 7/345* (2013.01)

(58) Field of Classification Search
None
See application file for complete search history.

(56) References Cited

U.S. PATENT DOCUMENTS

| | | | | |
|---|---|---|---|---|
| 7,810,595 | B2 * | 10/2010 | Moran .............. | H01M 8/04302 |
| | | | | 180/65.31 |
| 10,723,236 | B2 * | 7/2020 | Tanaka .................... | B60L 50/70 |
| 10,958,069 | B2 * | 3/2021 | Gemin ...................... | B60L 7/14 |
| 2009/0233127 | A1 * | 9/2009 | Ohya ................ | H01M 8/04917 |
| | | | | 429/429 |
| 2010/0209795 | A1 * | 8/2010 | Hardwicke ....... | H01M 8/04559 |
| | | | | 429/432 |
| 2013/0065089 | A1 * | 3/2013 | Kazuno ............. | H01M 8/04753 |
| | | | | 429/9 |
| 2018/0290559 | A1 * | 10/2018 | Oya ......................... | B60L 58/40 |
| 2021/0016679 | A1 * | 1/2021 | Takasaki ................. | B60L 58/40 |
| 2021/0188130 | A1 * | 6/2021 | Kunzwa .................. | B60L 58/15 |

FOREIGN PATENT DOCUMENTS

| | | | |
|---|---|---|---|
| JP | 2007-236132 | A | 9/2007 |
| KR | 10-2007-0060752 | A | 6/2007 |
| KR | 10-2021-0072223 | A | 6/2021 |

* cited by examiner

*Primary Examiner* — Rexford N Barnie
*Assistant Examiner* — Joel Barnett
(74) *Attorney, Agent, or Firm* — Fox Rothschild LLP

(57)     ABSTRACT

A fuel cell vehicle of the disclosure includes a cell stack including a plurality of unit cells stacked on one another, a boost converter configured to boost the output from the cell stack and to output the boosted output as main power, a supercapacitor configured to be charged with the power generated in the cell stack to generate auxiliary power, and a load terminal connected to the boost converter instead of the cell stack to receive the main power and connected to the supercapacitor to receive the auxiliary power so as to be driven.

17 Claims, 10 Drawing Sheets

100

FUEL CELL VEHICLE

CROSS REFERENCE TO RELATED APPLICATIONS

This application claims, under 35 U.S.C. § 119 (a), the benefit of and priority to Korean Patent Application No. 10-2022-0101405, filed on Aug. 12, 2022, which is hereby incorporated by reference in entirety.

BACKGROUND OF THE DISCLOSURE

Field of the Disclosure

Embodiments relate to a fuel cell vehicle.

Discussion of the Related Art

In a vehicle equipped with a fuel cell including a cell stack, a battery or a supercapacitor is charged with power generated in the fuel cell, and a load of the fuel cell vehicle, such as a motor, is driven using power charged in the battery or the supercapacitor.

When the fuel cell vehicle is initially driven, it is necessary to boost the voltage stored in the battery in order to generate power for driving an air compressor. In the case in which the voltage needs to be boosted to a high level, the price, volume, and weight of a converter for boosting the voltage may increase. Therefore, a solution to this problem is required.

Further, when the fuel cell and the supercapacitor are used, it is difficult to appropriately distribute the power generated in the fuel cell and the power charged in the supercapacitor to a load of the fuel cell vehicle. Therefore, research with the goal of solving this problem is underway.

SUMMARY OF THE DISCLOSURE

Accordingly, embodiments are directed to a fuel cell vehicle that substantially obviates one or more problems due to limitations and disadvantages of the related art.

Embodiments provide a fuel cell vehicle capable of reducing the capacity of a battery converter, which operates for initial driving sequence, and capable of performing control such that main power and auxiliary power are efficiently distributed to a load terminal of the fuel cell vehicle.

However, the objects to be accomplished by the embodiments are not limited to the above-mentioned objects, and other objects herein will be clearly understood by those skilled in the art from the following description.

A fuel cell power system for a vehicle according to an embodiment may include a cell stack including a plurality of unit cells stacked on one another, a boost converter configured to boost the output from the cell stack and to output the boosted output as main power, a supercapacitor configured to be charged with the power generated in the cell stack generate auxiliary power, and a load terminal connected to the boost converter and the supercapacitor instead of the cell stack, the load terminal being configured to receive the main power and the auxiliary power so as to be driven.

In an example, the fuel cell vehicle may further include an initial charging converter configured to convert the level of the power generated in the cell stack into a converted level of power and to provide the converted level of power to the supercapacitor.

In an example, the initial charging converter may directly receive the power generated in the fuel stack.

In an example, the initial charging converter may convert the level of an output power from the boost converter into a converted level of power and may provide the converted level of power to the supercapacitor.

In an example, the fuel cell vehicle may further include a battery, a battery converter configured to boost the voltage output from the battery, and a stack driving unit configured to drive the cell stack to generate power in response to driving power.

In an example, power having a level corresponding to the voltage boosted by the battery converter may be greater than the average value of the driving power.

In an example, power corresponding to the voltage boosted by the battery converter may correspond to the driving power.

In an example, power having a level corresponding to the voltage boosted by the battery converter may be equal to or less than the average value of the driving power.

In an example, the supercapacitor may be charged with the power corresponding to the voltage boosted by the battery converter to generate the driving power.

In an example, the initial charging converter may be disposed between the cell stack and the supercapacitor so as to be connected thereto.

In an example, the initial charging converter may be disposed between the boost converter and the supercapacitor so as to be connected thereto.

In an example, the fuel cell vehicle may further include a first switching unit disposed between the boost converter and the load terminal so as to be selectively connected thereto, a second switching unit disposed between the first switching unit and the supercapacitor so as to be selectively connected thereto, a precharge terminal connected in parallel to the second switching unit and including a third switching unit and a resistor connected to each other in series, a fourth switching unit disposed between the initial charging converter and the supercapacitor so as to be selectively connected thereto, and a controller configured to control a switching operation for each of the first switching unit through the fourth switching unit, respectively.

In an example, the fuel cell vehicle may further include a first switching unit disposed between the boost converter and the load terminal so as to be selectively connected thereto, a second switching unit disposed between the first switching unit and the supercapacitor so as to be selectively connected thereto, a precharge terminal connected in parallel to the second switching unit and including a third switching unit and a resistor connected to each other in series, a fourth switching unit disposed between the first switching unit and the initial charging converter so as to be selectively connected thereto, and a controller configured to a control switching operation of the first switching unit through the fourth switching unit, respectively.

In an example, each of the battery converter and the stack driving unit may be connected to a contact point between the first switching unit and the second switching unit and to a contact point between the first switching unit and the precharge terminal.

In an example, each of the battery converter and the stack driving unit may be connected to a contact point between the first switching unit and the fourth switching unit and to a contact point between the first switching unit and the second switching unit.

In an example, the fuel cell vehicle may further include a fifth switching unit disposed between the cell stack and the boost converter so as to be selectively connected thereto, a sixth switching unit disposed between the boost converter and the supercapacitor and between the boost converter and the load terminal so as to be selectively connected thereto, a seventh switching unit disposed between the initial charging converter and the supercapacitor and between the initial charging converter and the load terminal so as to be selectively connected thereto, and a controller configured to control switching operation of the fifth switching unit through the seventh switching unit, respectively.

In an example, each of the battery converter and the stack driving unit may be connected to a contact point between the fifth switching unit and the boost converter and to a contact point between the fifth switching unit and the initial charging converter.

In an example, each of the battery converter and the stack driving unit may be connected to a contact point between the fifth switching unit and the boost converter.

A fuel cell vehicle according to another embodiment may include a cell stack including a plurality of unit cells stacked on one another, a boost converter configured to boost the output from the cell stack and to output the boosted output as main power, a supercapacitor configured to be charged with the power generated in the cell stack to generate auxiliary power, a load terminal connected to the boost converter and the supercapacitor, the load terminal being configured to receive the main power from the boost converter and to receive the auxiliary power from the supercapacitor so as to be driven, a first switching unit disposed between the boost converter and the load terminal so as to be selectively connected thereto, an initial charging converter disposed between cell the stack and the supercapacitor so as to be connected thereto and being configured to convert the level of the power generated in the cell stack into a converted level of power and to provide the converted level of power to the supercapacitor, a battery, a stack driving unit configured to drive the cell stack to generate power in response to driving power, a battery converter configured to boost the voltage output from the battery and being connected to the stack driving unit, a second switching unit disposed between: (a) the load terminal and the supercapacitor, (b) between the stack driving unit and the supercapacitor, and (c) between the battery converter and the supercapacitor so as to be connected thereto, a precharge terminal connected in parallel to the second switching unit and including a third switching unit and a resistor connected to each other in series, and a fourth switching unit disposed between the initial charging converter and the cell stack so as to be selectively connected thereto or disposed between the initial charging converter and the supercapacitor so as to be selectively connected thereto.

A fuel cell power system for a vehicle according to still another embodiment may include a cell stack including a plurality of unit cells stacked on one another, a boost converter configured to boost the output from the cell stack and to output the boosted output main power, supercapacitor configured to be charged with the power generated in the cell stack to generate auxiliary power, a load terminal connected to the boost converter and the supercapacitor, the load terminal being configured to receive the main power from the boost converter and to receive the auxiliary power from the supercapacitor, an initial charging converter disposed between the boost converter and the supercapacitor so as to be connected thereto and being configured to convert the level of the output from the boost converter and to provide the output having the converted level to the supercapacitor, a first switching unit disposed between the boost converter and the load terminal so as to be selectively connected thereto, a battery, a stack driving unit configured to drive the cell stack to generate power in response to driving power, a battery converter configured to boost the voltage output from the battery and being connected to the stack driving unit, a second switching unit disposed between (a) the load terminal and the supercapacitor and (b) between the stack driving unit and the supercapacitor so as to be connected thereto, a precharge terminal connected in parallel to the second switching unit and including a third switching unit and a resistor connected to each other in series, and a fourth switching unit disposed between the first switching unit and the initial charging converter and between the battery converter and the initial charging converter so as to be selectively connected thereto or disposed between the initial charging converter and the supercapacitor so as to be connected thereto.

A fuel cell vehicle according to still another embodiment may include a cell stack including a plurality of unit cells stacked on one another, a boost converter configured to boost the output from the cell stack and to output the boosted output as main power, a supercapacitor configured to be charged with the power generated in the cell stack to generate auxiliary power, a load terminal connected to the boost converter to receive the main power and connected to the supercapacitor to receive the auxiliary power so as to be driven, an initial charging converter configured to convert the level of the output from the cell stack and to provide the output having the converted level to the supercapacitor, a fifth switching unit disposed between the boost converter and the cell stack and between the initial charging converter and the cell stack so as to be connected thereto, a sixth switching unit disposed between the supercapacitor and the boost converter and between the load terminal and the boost converter so as to be connected thereto, a seventh switching unit disposed between the supercapacitor and the initial charging converter and between the load terminal and the initial charging converter so as to be connected thereto, a battery, a stack driving unit configured to drive the cell stack to generate power in response to driving power and connected to a contact point between the fifth switching unit and the boost converter, and a battery converter configured to boost the voltage output from the battery and connected to the stack driving unit, the above contact point, and a contact point between the fifth switching unit and the initial charging converter.

A fuel cell vehicle according to still another embodiment may include a cell stack including a plurality of unit cells stacked on one another, a boost converter configured to boost the output from the cell stack and to output the boosted output as main power, a supercapacitor configured to be charged with the power generated in the cell stack to generate auxiliary power, a load terminal connected to the boost converter to receive the main power and connected to the supercapacitor to receive the auxiliary power so as to be driven, an initial charging converter configured to convert the level of the output from the boost converter and to provide the output having the converted level to the supercapacitor, a fifth switching unit disposed between the cell stack and the boost converter so as to be connected thereto, a sixth switching unit disposed between a contact point between the boost converter and the initial charging converter and the supercapacitor and between the contact point between the boost converter and the initial charging converter and the load terminal so as to be connected thereto, a seventh switching unit disposed between the supercapacitor and the initial charging converter and between the load terminal and the initial charging converter so as to be connected thereto, a battery, a stack driving unit configured to drive the cell stack to generate power in response to driving power and connected to a contact point between the fifth switching unit and the boost converter, and a battery converter configured to boost the voltage output from the battery and connected to the stack driving unit and the contact point.

BRIEF DESCRIPTION OF THE DRAWINGS

The accompanying drawings, which are included to provide a further understanding of the disclosure and are incorporated in and constitute a part of this application, illustrate embodiment (s) of the disclosure and together with the description serve to explain the principle of the disclosure. In the drawings.

DETAILED DESCRIPTION OF THE DISCLOSURE

The present disclosure will now be described more fully hereinafter with reference to the accompanying drawings, in which various embodiments are shown. The examples, however, may be embodied in many different forms, and should not be construed as being limited to the embodiments set forth herein. Rather, these embodiments are provided so that this disclosure will be more thorough and complete, and will more fully convey the scope of the disclosure to those skilled in the art.

It will be understood that when an element is referred to as being "on" or "under" another element, it may be directly on/under the element, or one or more intervening elements may also be present.

When an element is referred to as being "on" or "under", "under the element" as well as "on the element" may be included based on the element.

In addition, relational terms, such as "first", "second", "on/upper part/above", and "under/lower part/below", are used only to distinguish between one subject or element and another subject or element, without necessarily requiring or involving any physical or logical relationship or sequence between the subjects or elements.

Figure 1:
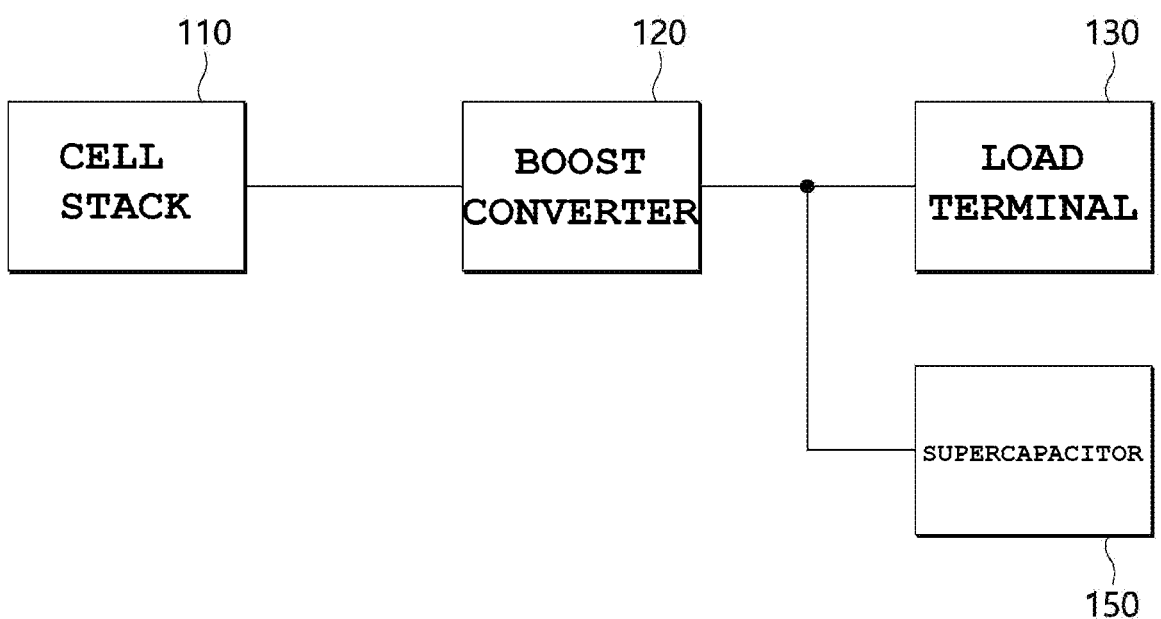
FIG. 1 is a block diagram of a fuel cell vehicle according to an embodiment.

Hereinafter, a fuel cell vehicle according to an embodiment will be described with reference to the accompanying drawings, FIG. 1 is a block diagram of a fuel cell vehicle 100 according to an embodiment.

The fuel cell vehicle 100 shown in FIG. 1 may include a cell stack 110, a boost converter 120, a load terminal 130, and a supercapacitor 150.

First, an example of a fuel cell that may be included in the fuel cell vehicle 100 will be described below in brief. However, the embodiments are not limited to any specific form of fuel cell included in the fuel cell vehicle 100.

The fuel cell may be a polymer electrolyte membrane fuel cell (or a proton exchange membrane fuel cell) (PEMFC), which has been studied most extensively as a power source for driving vehicles. The fuel cell may include a cell stack 110.

The cell stack 110 may include a plurality of unit cells, which are stacked on one another in a first direction. Each unit cell may generate 0.6 volts to 1.0 volt of electricity, on average 0.7 volts of electricity. The number of unit cells may be determined based on the intensity of the power that is to be generated in the fuel cell.

The first direction may be the direction in which the fuel cell vehicle 100 travels, or may be a direction intersecting the direction in which the fuel cell vehicle 100 travels.

The boost converter 120 may be a kind of DC/DC converter that converts the DC-type input voltage into a DC-type output voltage having a level higher than the level of the DC-type input voltage. The boost converter 120 may boost the output from the cell stack 110 and may output the same to the load terminal 130 as main power. For example, the output voltage VO of the boost converter 120 may be expressed using the following Equation 1.

$$VO=VI\times R \tag{Equation 1}$$

Here, VI represents the input voltage of the boost converter 120, and R represents the boosting ratio of the boost converter 120.

In Equation 1, VO is a fixed value. Accordingly, when the boosting ratio R increases, the input voltage VI decreases, and when the boosting ratio R decreases, the input voltage VI increases.

Figure 2:
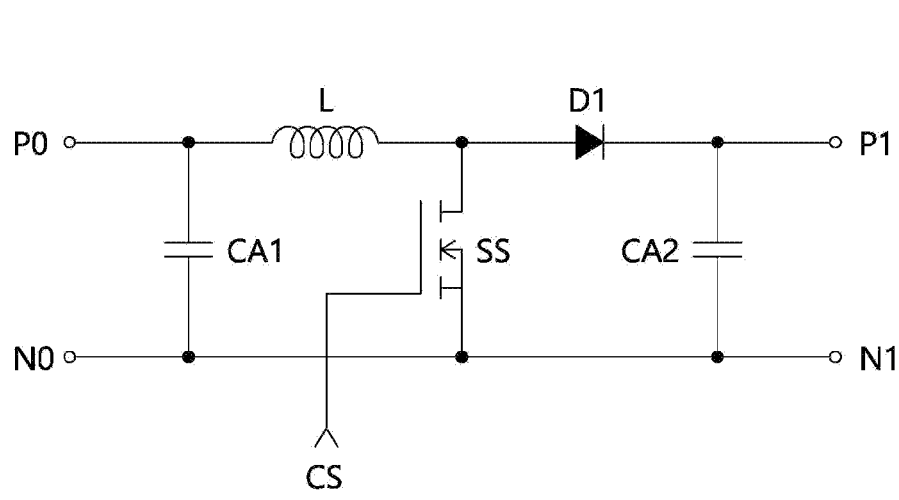
FIG. 2 is a circuit diagram of an embodiment of the boost converter shown in FIG. 1.

FIG. 2 is a circuit diagram of an embodiment 120A of the boost converter 120 shown in FIG. 1.

The boost converter 120 shown in FIG. 1 is not limited to the embodiment 120A shown in FIG. 2.

The boost converter 120A shown in FIG. 2 may include first and second capacitors CA1 and CA2, an inductor L, a diode D1, and a semiconductor switch SS.

The first capacitor CA1 may be disposed between an output terminal PO of a positive-electrode side of the cell stack 110 and an output terminal NO of a negative-electrode side of the cell stack 110.

The inductor L has one end connected to the output terminal PO of the positive-electrode side of the cell stack 110 and another end connected to a positive electrode of the diode D1. That is, the inductor L is disposed between the output terminal PO of the positive-electrode side of the cell stack 110 and a positive electrode of the diode D1.

The diode D1 has a positive electrode connected to the other end of the inductor L.

The second capacitor CA2 may be disposed between the negative electrode of the diode D1 and the output terminal NO of the negative-electrode side of the cell stack 110.

The first and second capacitors CA1 and CA2 are smoothing capacitors.

The semiconductor switch SS may be switched on (or turned on) or switched off (or turned off) in response to a driving control signal CS, and may be disposed between the positive electrode of the diode D1 and the output terminal NO of the negative-electrode side of the cell stack 110 so as to be connected thereto.

The semiconductor switch SS may be implemented as an insulated gate bipolar transistor (IGBT) or a field effect transistor (FET). For example, as illustrated in FIG. 2, the semiconductor switch SS may be implemented as a transistor. The transistor may include a gate G connected to the driving control signal CS, a drain D connected to the positive electrode of the diode D1, and a source S connected to the output terminal NO of the negative-electrode side of the cell stack 110.

Meanwhile, the supercapacitor 150 may be charged with the power generated in the cell stack 110 as auxiliary power. That is, the cell stack 110 serves to generate main power necessary for the fuel cell vehicle 100, and the supercapacitor 150 serves to generate auxiliary power necessary for the fuel cell vehicle 100.

At least one of the main power or the auxiliary power may be supplied to the load terminal 130.

According to an embodiment, the load terminal 130 may be driven by the main power received from the boost converter 120 connected thereto and the auxiliary power received from the supercapacitor 150 connected thereto. For example, the load terminal 130 may include an inverter (not shown) and a motor (not shown).

The inverter is connected to the output terminal of the positive-electrode side of the boost converter 120 and to the output terminal of the negative-electrode side of the boost converter 120, converts the received DC-type voltage or the DC-type voltage charged in the supercapacitor 150 into AC-type voltage depending on the travel state of the fuel cell vehicle 100, and outputs the AC-type voltage to the motor.

The motor may be driven in response to the AC-type voltage output from the inverter. That is, the motor may rotate upon receiving the AC voltage for the motor from the inverter, and thus may serve to drive the fuel cell vehicle 100. For example, the motor may be a three-phase AC rotating device including a rotor in which a permanent magnet is embedded, but the embodiments are not limited to any specific form of the motor.

In addition, although not shown, the load terminal 130 of the fuel cell vehicle 100 may include parts necessary for driving the vehicle, such as a motor-driven power steering (MDPS) device, a radiator fan, and headlights. These various parts included in the load terminal 130 may be driven upon receiving the voltage output from the boost converter 120 or the voltage charged in the supercapacitor 150 as driving voltage.

According to an embodiment, the load terminal 130 receives the main power from the boost converter 120, rather than directly receiving the same from the cell stack 110.

Hereinafter, various embodiments 100A to 100D of the fuel cell vehicle 100 shown in FIG. 1 will be described with reference to the accompanying drawings.

Figure 3:
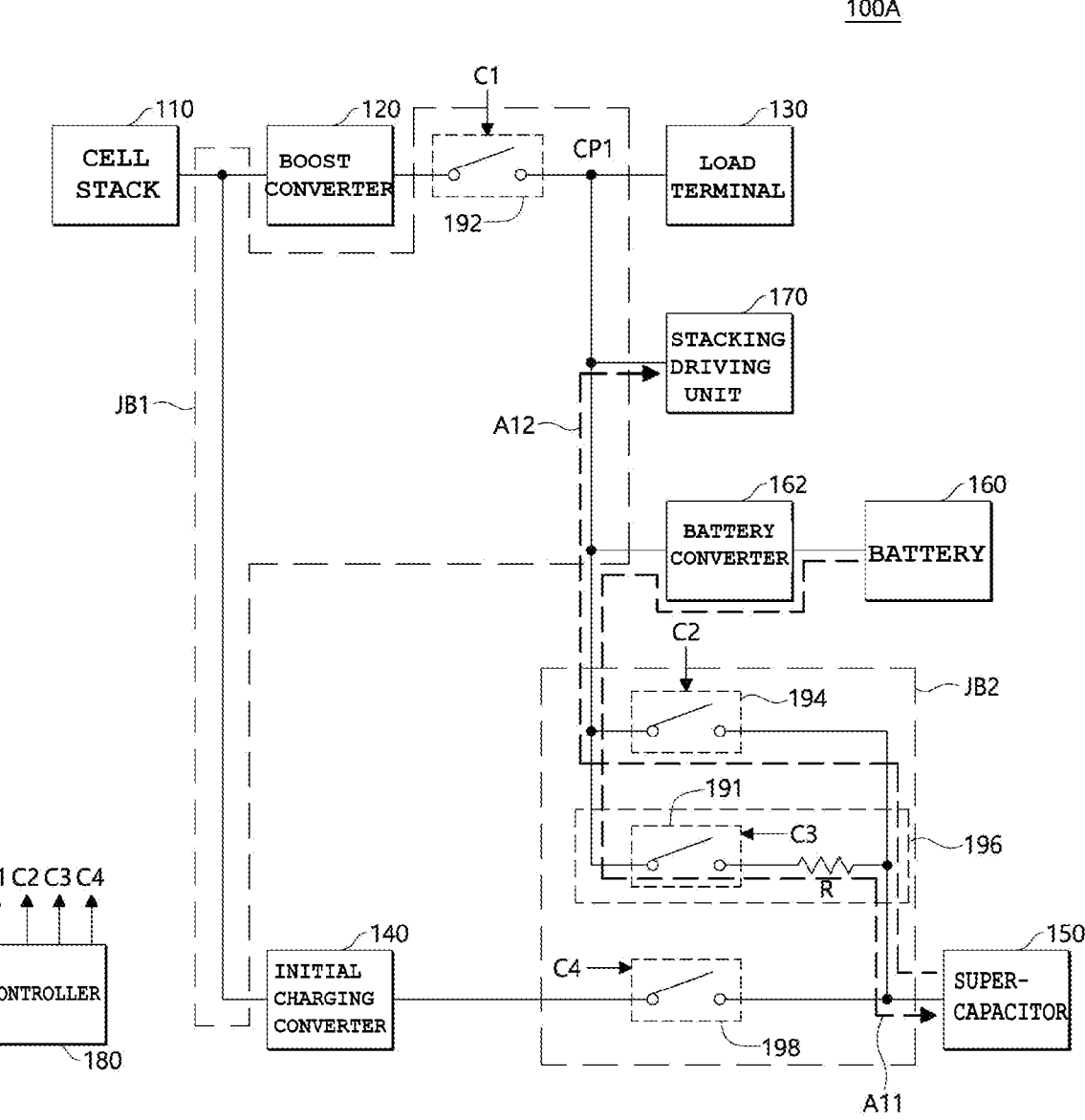
FIG. 3 is a block diagram of a fuel cell vehicle according to an embodiment.
Figure 4:
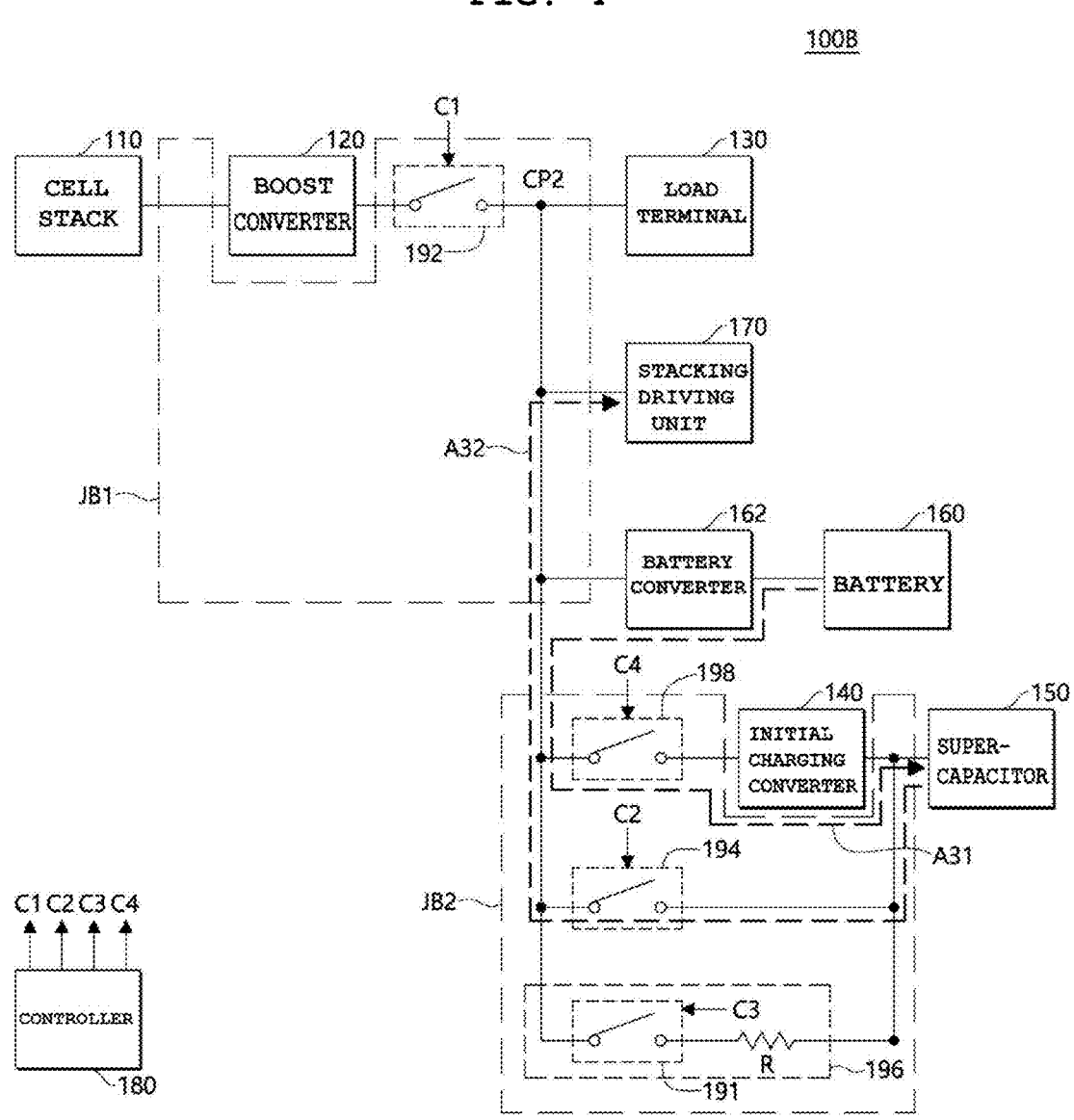
FIG. 4 is a block diagram of a fuel cell vehicle according to another embodiment.
Figure 5:
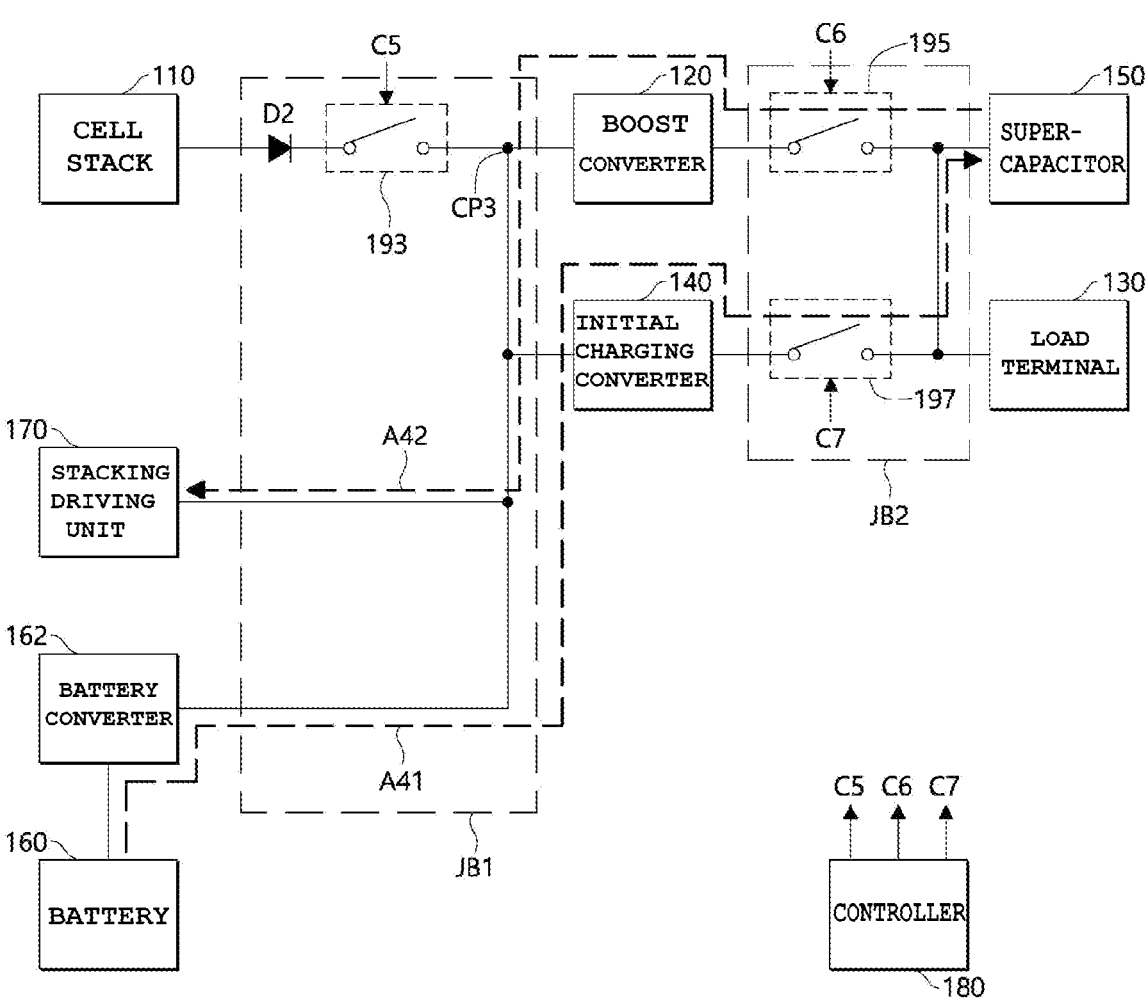
FIG. 5 is a block diagram of a fuel cell vehicle according to still another embodiment.
Figure 6:
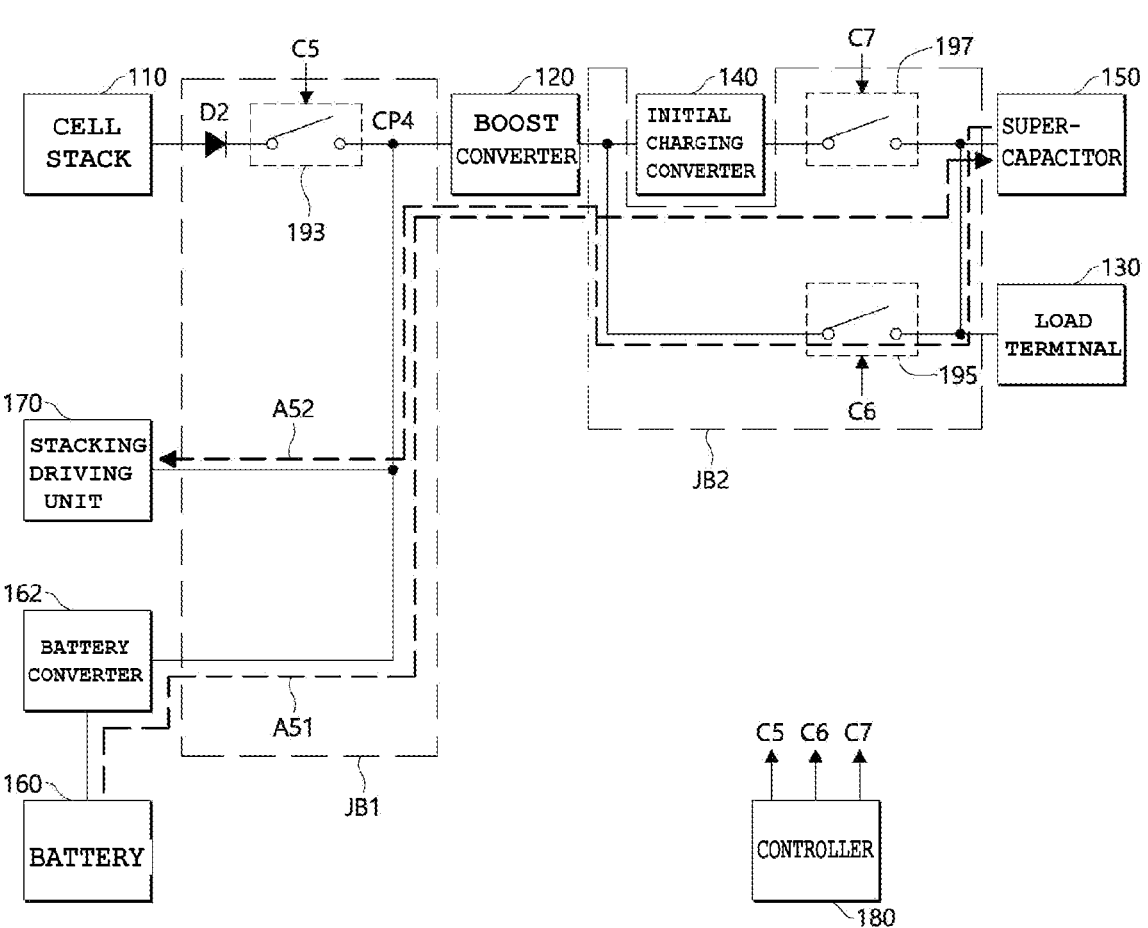
FIG. 6 is a block diagram of a fuel cell vehicle according to still another embodiment.

FIG. 3 is a block diagram of a fuel cell vehicle 100A according to an embodiment, FIG. 4 is a block diagram of a fuel cell vehicle 100B according to another embodiment, FIG. 5 is a block diagram of a fuel cell vehicle 100C according to still another embodiment, and FIG. 6 is a block diagram of a fuel cell vehicle 100D according to still another embodiment.

The same parts that play the same roles in the fuel cell vehicles shown in FIGS. 3 to 6 are denoted by the same reference numerals, and a duplicate description thereof will be omitted.

Each of the fuel cell vehicles 100A to 100D according to the embodiments may further include an initial charging converter 140.

When the supercapacitor 150 is left for a long period of time, the level of the voltage charged in the supercapacitor 150 (hereinafter referred to as "capacitor voltage") may decrease.

If the boost converter 120 is driven when the level of the capacitor voltage is equal to or lower than the level of the voltage generated and output from the cell stack 110 (hereinafter referred to as "stack voltage"), the boost converter 120 or a switching unit adjacent to the boost converter 120 may be damaged.

Therefore, the initial charging converter 140 is connected to the supercapacitor 150 to increase the level of the capacity voltage.

For example, the initial charging converter 140 may be implemented as a buck/boost converter. The buck/boost converter may operate as a buck converter when the capacitor voltage is less than the voltage input thereto (e.g. the stack voltage), and may operate as a boost converter when the capacitor voltage is greater than the voltage input thereto (e.g. the stack voltage). That is, the initial charging converter 140 operates as a buck converter or a boost converter depending on the magnitude of the capacitor voltage and the magnitude of the voltage input thereto (e.g. the stack voltage). Since the circuit configuration of the initial charging converter 140 is well known in the art, a detailed description thereof will be omitted. Therefore, the embodiments are not limited to any specific configuration of the initial charging converter 140.

As shown in FIGS. 3 and 5, the initial charging converter 140 is disposed between the cell stack 110 and the supercapacitor 150, and converts the level of the power generated in the cell stack 110 and supplies the same to the supercapacitor 150. In this case, the initial charging converter 140 directly receives the power generated in the cell stack 110.

Alternatively, as shown in FIGS. 4 and 6, the initial charging converter 140 is disposed between the boost converter 120 and the supercapacitor 150, and converts the level of the output from the boost converter 120 and supplies the same to the supercapacitor 150.

In addition, each of the fuel cell vehicles 100A to 100D according to the embodiments may further include a battery 160, a battery converter 162, and a stack driving unit 170.

The battery 160 may output voltage of, for example, 12 volts, but the embodiments are not limited to any specific level of the voltage output from the battery 160.

The battery converter 162 may boost the voltage output from the battery 160, and may directly output the boosted high voltage to the stack driving unit 170 or to the supercapacitor 150. In addition, the battery converter 162 may reduce the high voltage output from the cell stack 110, and may store the same in the battery 160.

The stack driving unit 170 may drive the cell stack 110 in response to driving power. For example, the stack driving unit 170 may be a peripheral auxiliary device (balance of plant (BOP)), which assists in operation of the cell stack 110. To this end, the stack driving unit 170 may include an air compressor, a humidifier, and the like.

According to an embodiment, the power corresponding to the voltage boosted by the battery converter 162 may correspond to the driving power for driving the air compressor of the stack driving unit 170. In this case, the power having a level corresponding to the voltage boosted by the battery converter 162 may be greater than the average value of the driving power. For example, when only the air compressor is driven among the components of the stack driving unit 170, the cell stack 110 may generate power. That is, in order for the cell stack 110 to generate power, it is necessary to supply the driving power to the air compressor. In this case, the power for driving the air compressor at the beginning (hereinafter referred to as "maximum power") is much greater than the average value of the power for driving the air compressor in a normal state after the beginning (hereinafter referred to as "average power"). Accordingly, when the power corresponding to the voltage boosted by the battery converter 162 is supplied to the air compressor as a driving power, the battery converter 162 may boost the voltage stored in the battery 160 to a high level corresponding to the maximum power at the beginning.

According to another embodiment, the power having a level corresponding to the voltage boosted by the battery converter 162 may be equal to or less than the average power, which is the average value of the driving power. In this Case, the supercapacitor 150 may be charged with the power corresponding to the voltage boosted by the battery converter 162 to generate driving power. In particular, even if the level corresponding to the voltage boosted by the battery converter 162 is lower than the level of the voltage corresponding to the average power, when the supercapacitor 150 is charged with power, the maximum power for driving the air compressor may be generated. When the driving power is generated using the supercapacitor 150 in this manner, it is not necessary for the battery converter 162 to boost the voltage to a high level.

The maximum power and the average power may vary depending on the revolutions per minute (RPM) of the air compressor. For example, the RPM of the air compressor may be 50 k to 70 k, the maximum power may be 8 kW to 11 kW, and the average power may be 1 kW to 5 kw.

Therefore, when the battery converter 162 directly generates driving power to drive the air compressor, the battery converter 162 needs to boost the voltage of 12 volts stored in the battery 160 to high voltage having a level corresponding to 8 kW to 11 kW at the beginning. On the other hand, when the supercapacitor 150 is charged with the output from the battery converter 162 and the charged voltage is used as the driving power, the battery converter 162 does not need to boost the voltage of 12 volts stored in the battery 160 to high voltage having a level corresponding to 8 kW to 11 kW. In this case, for example, the battery converter 162 may boost the voltage of 12 volts stored in the battery 160 to high voltage having a level corresponding to 2 kW. As the level to which the voltage is to be boosted by the battery converter 162 increases, that is, as the capacity of the battery converter 162 increases, the size, weight, and production cost of the battery converter 162 increase. However, according to the embodiments, since the driving power is generated using the supercapacitor 150, the size and weight of the battery converter 162 may be reduced, and an increase in the production cost thereof may be prevented. As a result, the battery converter 162 may have a competitive price.

As described above, the size or price of the battery converter 162 may be reduced compared to when the voltage output from the battery 160 is boosted to a level corresponding to the maximum power. This operation, that is, the initial operation of the air driving compressor (hereinafter referred to as "initial driving sequence"), will be described later with reference to FIGS. 3 to 6.

Various switching units included in the fuel cell vehicles 100A to 100D shown in FIGS. 3 to 6 will be described below.

According to an embodiment, in the case of the fuel cell vehicle 100A or 100C shown in FIG. 3 or 5, the initial charging converter 140 is disposed between the cell stack 110 and the supercapacitor 150.

According to another embodiment, in the case of the fuel cell vehicle 100B or 100D shown in FIG. 4 or 6, the initial charging converter 140 is disposed between the boost converter 120 and the supercapacitor 150 so as to be connected thereto.

Each of the fuel cell vehicles 100A and 100B shown in FIGS. 3 and 4 may include a first switching unit 192, a second switching unit 194, a precharge terminal 196, a fourth switching unit 198, and a controller 180.

The configurations of the first switching unit 192, the second switching unit 194, and the precharge terminal 196 shown in FIG. 3 and the configurations of those shown in FIG. 4 are the same as each other, but the configuration of the fourth switching unit 198 shown in FIG. 3 and the configuration of that shown in FIG. 4 are different from each other.

The first switching unit 192 may be disposed between the boost converter 120 and the load terminal 130 so as to be connected thereto, and may be switched on (or turned on) or switched off (or turned off) in response to a first control signal C1.

The second switching unit 194 may be disposed between the first switching unit 192 and the supercapacitor 150 so as to be connected thereto, and may be switched on (or turned on) or switched off (or turned off) in response to a second control signal C2.

The precharge terminal 196 may be connected in parallel to the second switching unit 194, and may include a third switching unit 191 and a resistor R, which are connected to each other in series. The third switching unit 191 may be switched on (or turned on) or switched off (or turned off) in response to a third control signal C3.

The voltage charged in the supercapacitor 150 and the voltage output from the boost converter 120 are different from each other. Therefore, before the voltage charged in the supercapacitor 150 is provided to the load terminal 130, the precharge terminal 196 is connected to a contact point CP1 between the first switching unit 192 and the load terminal 130 so that the level of the voltage charged in the supercapacitor 150 and the level of the voltage output from the boost converter 120 become equal to each other.

Meanwhile, in the case of the fuel cell vehicle 100A shown in FIG. 3, the fourth switching unit 198 may be disposed between the initial charging converter 140 and the supercapacitor 150 so as to be connected thereto. Alternatively, unlike what is shown in the drawing, the fourth switching unit 198 may be disposed between the cell stack 110 and the initial charging converter 140 so as to be connected thereto. In this case, each of the battery converter 162 and the stack driving unit 170 may be connected to the first contact point CP1. The first contact point CP1 is located between the first switching unit 192 and the second switching unit 194 and between the first switching unit 192 and the precharge terminal 196.

Alternatively, in the case of the fuel cell vehicle 100B shown in FIG. 4, the fourth switching unit 198 may be disposed between the first switch 192 and the initial charging converter 140 so as to be connected thereto. Alternatively, unlike what is shown in the drawing, the fourth switching unit 198 may be disposed between the initial charging converter 140 and the supercapacitor 150 so as to be connected thereto. In this case, each of the battery converter 162 and the stack driving unit 170 may be connected to a second contact point CP2. The second contact point CP2 is located between the first switching unit 192 and the fourth switching unit 198 and between the first switching unit 192 and the second switching unit 194.

The controller 180 serves to generate first to fourth control signals C1, C2, C3, and C4 for respectively controlling switching operation of the first to fourth switching units 192, 194, 191, and 198.

Each of the fuel cell vehicles 100C and 100D shown in FIGS. 5 and 6 may include a fifth switching unit 193, a sixth switching unit 195, a seventh switching unit 197, and a controller 180.

The configurations of the fifth to seventh switching units 193, 195, and 197 shown in FIG. 5 and the configurations of those shown in FIG. 6 are the same as each other.

The fifth switching unit 193 may be disposed between the cell stack 110 and the boost converter 120 so as to be connected thereto, and may be switched on (or turned on) or switched off (or turned off) in response to a fifth control signal C5.

The sixth switching unit 195 may be disposed between the boost converter 120 and the supercapacitor 150 and between the boost converter 120 and the load terminal 130 so as to be connected thereto, and may be switched on (or turned on) or switched off (or turned off) in response to a sixth control signal C6.

The seventh switching unit 197 may be disposed between the initial charging converter 140 and the supercapacitor 150 and between the initial charging converter 140 and the load terminal 130 so as to be connected thereto, and may be switched on (or turned on) or switched off (or turned off) in response to a seventh control signal C7.

Each of the battery converter 162 and the stack driving unit 170 shown in FIG. 5 may be connected to the third contact point CP3. The third contact point CP3 is located between the fifth switching unit 193 and the boost converter 120 and between the fifth switching unit 193 and the initial charging converter 140.

Each of the battery converter 162 and the stack driving unit 170 shown in FIG. 6 may be connected to a fourth contact point CP4. The fourth contact point CP4 may be located between the fifth switching unit 193 and the boost converter 120.

In addition, each of the fuel cell vehicles 100C and 100D shown in FIGS. 5 and 6 may further include a diode D2, The diode D2 may be located between the cell stack 110 and the boost converter 120, and may prevent flow of a reverse current or application of a reverse voltage to the cell stack 110 from the boost converter 120, thereby protecting the cell stack 110.

The controller 180 serves to generate fifth to seventh control signals C5, C6, and C7 for respectively controlling switching operation of the fifth to seventh switching units 193, 195, and 197.

The configurations of the fuel cell vehicles 100A to 100D shown in FIGS. 3 to 6 will be described below.

First, the fuel cell vehicle 100A according to the embodiment shown in FIG. 3 may include a cell stack 110 including a plurality of unit cells stacked on one another, a boost converter 120 configured to boost the output from the cell stack 110 and to output the boosted output as main power, a supercapacitor 150 configured to be charged with the power generated in the cell stack 110 to generate auxiliary power, a load terminal 130 connected to the boost converter

120 to receive the main power and connected to the supercapacitor 150 to receive the auxiliary power so as to be driven, first switching unit 192 disposed between the boost converter 120 and the load terminal 130 so as to be connected thereto, an initial charging converter 140 disposed between the cell stack 110 and the supercapacitor 150 so as to be connected thereto and configured to convert the level of the power generated in the cell stack 110 and to provide the power having the converted level to the supercapacitor 150, a battery 160, a stack driving unit 170 configured to drive the cell stack 110 to generate power in response to driving power, a battery converter 162 configured to boost the voltage output from the battery 160 and connected to the stack driving unit 170, a second switching unit 194 disposed between the load terminal 130 and the supercapacitor 150, between the stack driving unit 170 and the supercapacitor 150, and between the battery converter 162 and the supercapacitor 150 so as to be connected thereto, a precharge terminal 196 connected in parallel to the second switching unit 194 and including a third switching unit 191 and a resistor R connected to each other in series, and a fourth switching unit 198 disposed between the initial charging converter 140 and the cell stack 110 so as to be connected thereto or disposed between the initial charging converter 140 and the supercapacitor 150 so as to be connected thereto.

Next, the fuel cell vehicle 100B according to the embodiment shown in FIG. 4 may include a cell stack 110 including a plurality of unit cells stacked on one another, a boost converter 120 configured to boost the output from the cell stack 110 and to output the boosted output as main power, a supercapacitor 150 configured to be charged with the power generated in the cell stack 110 to generate auxiliary power, a load terminal 130 connected to the boost converter 120 to receive the main power and connected to the supercapacitor 150 to receive the auxiliary power so as to be driven, an initial charging converter 140 disposed between the boost converter 120 and the supercapacitor 150 so as to be connected thereto and configured to convert the level of the output from the boost converter 120 and to provide the output having the converted level to the supercapacitor 150, a first switching unit 192 disposed between the boost converter 120 and the load terminal 130 so as to be connected thereto, a battery 160, a stack driving unit 170 configured to drive the cell stack 110 to generate power in response to driving power, a battery converter 162 configured to boost the voltage output battery 160 and connected to the stack driving unit 170, a second switching unit 194 disposed between the load terminal 130 and the supercapacitor 150 and between the stack driving unit 170 and the supercapacitor 150 so as to be connected thereto, a precharge terminal 196 connected in parallel to the second switching unit 194 and including a third switching unit 191 and a resistor R connected to each other in series, and a fourth switching unit 198 disposed between the first switching unit 192 and the initial charging converter 140 and between the battery converter 162 and the initial charging converter 140 so as to be connected thereto or disposed between the initial charging converter 140 and the supercapacitor 150 so as to be connected thereto.

Next, the fuel cell vehicle 100C according to the embodiment shown in FIG. 5 may include a cell stack 110 including a plurality of unit cells stacked on one another, a boost converter 120 configured to boost the output from the cell stack 110 and to output the boosted output as main power, a supercapacitor 150 configured to be charged with the power generated in the cell stack 110 to generate auxiliary power, a load terminal 130 connected to the boost converter 120 to receive the main power and connected to the super-capacitor 150 to receive the auxiliary power so as to be driven, an initial charging converter 140 configured to convert the level of the output from the cell stack 110 and to provide the output having the converted level to the super-capacitor 150, a fifth switching unit 193 disposed between the boost converter 120 and the cell stack 110 and between the initial charging converter 140 and the cell stack 110 so as to be connected thereto, a sixth switching unit 195 disposed between the supercapacitor 150 and the boost converter 120 and between the load terminal 130 and the boost converter 120 so as to be connected thereto, a seventh switching unit 197 disposed between the supercapacitor 150 and the initial charging converter 140 and between the load terminal 130 and the initial charging converter 140 so as to be connected thereto, a battery 160, a stack driving unit 170 configured to drive the cell stack 110 to generate power in response to driving power and connected to a contact point CP3 between the fifth switching unit 193 and the boost converter 120, and a battery converter 162 configured to boost the voltage output from the battery 160 and connected to the stack driving unit 170, the above contact point CP3, and a contact point CP3 between the fifth switching unit 193 and the initial charging converter 140.

Next, the fuel cell vehicle 100D according to the embodiment shown in FIG. 6 may include a cell stack 110 including a plurality of unit cells stacked on one another, a boost converter 120 configured to boost the output from the cell stack 110 and to output the boosted output as main power, a supercapacitor 150 configured to be charged with the power generated in the cell stack 110 to generate auxiliary power, a load terminal 130 connected to the boost converter 120 to receive the main power and connected to the super-capacitor 150 to receive the auxiliary power so as to be driven, an initial charging converter 140 configured to convert the level of the output from the boost converter 120 and to provide the output having the converted level to the supercapacitor 150, fifth switching unit 193 disposed between the cell stack 110 and the boost converter 120 so as to be connected thereto, a sixth switching unit 195 disposed between a contact point between the boost converter 120 and the initial charging converter 140 and the supercapacitor 150 and between the contact point between the boost converter 120 and the initial charging converter 140 and the load terminal 130 so as to be connected thereto, a seventh switching unit 197 disposed between the supercapacitor 150 and the initial charging converter 140 and between the load terminal 130 and the initial charging converter 140 so as to be connected thereto, a battery 160, a stack driving unit 170 configured to drive the cell stack 110 to generate power in response to driving power and connected to a contact point CP4 between the fifth switching unit 193 and the boost converter 120, and a battery converter 162 configured to boost the voltage output from the battery 160 and connected to the stack driving unit 170 and the contact point CP4.

Each of the fuel cell vehicles 100A, 100B, 100C, and 100D according to the embodiments may further include junction boxes (or power distribution units or high-voltage junction boxes) JB1 and JB2. The junction boxes JB1 and JB2 may include various switching units and a diode D2, as shown in the drawings. Elements that may be included in the junction boxes JB1 and JB2 are shown in each of FIGS. 3 to 6. That is, as shown in FIGS. 3 and 4, the contact points CP1 and CP2 and the first switching unit 192 may be located in the first junction box JB1, and the contact points CP1 and CP2, the second switching unit 194, the precharge terminal 196, and the fourth switching unit 198 may be located in the second junction box JB2. In addition, as shown in FIGS. 5 and 6, the contact points CP3 and CP4, the diode D2, and the fifth switching unit 193 may be located in the first junction box JB1, and the sixth switching unit 195 and the seventh switching unit 197 may be located in the second junction box JB2.

Hereinafter, the above-mentioned initial driving sequence performed in the fuel cell vehicles 100A to 100D configured as described above will be described with reference to FIGS. 3 to 5.

First, in order for the fuel cell vehicle 100A shown in FIG. 3 to perform initial driving sequence, the controller 180 generates control signals C1, C2, C3, and C4, as shown in Table 1 below.

The following description will be given on the assumption that the switching units are switched off (or turned off) when the control signals C1 to C7 are "OFF" and are switched on (or turned on) when the control signals are "ON".

TABLE 1

| Operation Mode | C1 | C2 | C3 | C4 |
|---|---|---|---|---|
| OM1 | OFF | OFF | ON | OFF |
| OM2 | OFF | ON | OFF | OFF |

In a first operation mode OM1, the battery converter 162 boosts the voltage output from the battery 160, and provides the boosted voltage to the supercapacitor 150. To this end, as shown in Table 1, the first switching unit 192, the second switching unit 194, and the fourth switching unit 198 are switched off (or turned off), and the third switching unit 191 is switched on (or turned on). Accordingly, a path indicated by the arrow A11 may be formed.

Thereafter, in a second operation mode OM2, the power stored in the supercapacitor 150 is provided to the stack driving unit 170 as driving power. To this end, as shown in Table 1, the first switching unit 192, the third switching unit 191, and the fourth switching unit 198 are switched off, and the second switching unit 194 is switched on. Accordingly, a path indicated by the arrow A12 may be formed.

Next, in order for the fuel cell vehicle 100B shown in FIG. 4 to perform initial driving sequence, the controller 180 generates control signals C1, C2, C3, and C4, as shown in Table 2 below.

TABLE 2

| Operation Mode | C1 | C2 | C3 | C4 |
|---|---|---|---|---|
| OM1 | OFF | OFF | OFF | ON |
| OM2 | OFF | ON | OFF | OFF |

In a first operation mode OM1, the battery converter 162 boosts the voltage output from the battery 160, and provides the boosted voltage to the supercapacitor 150. To this end, as shown in Table 2, the first switching unit 192, the second switching unit 194, and the third switching unit 191 are switched off (or turned off), and the fourth switching unit 198 is switched on (or turned on). Accordingly, a path indicated by the arrow A31 may be formed.

Thereafter, in a second operation mode OM2, the power stored in the supercapacitor 150 is provided to the stack driving unit 170 as driving power. To this end, as shown in Table 2, the first switching unit 192, the third switching unit 191, and the fourth switching unit 198 are switched off, and the second switching unit 194 is switched on. Accordingly, a path indicated by the arrow A32 may be formed.

Next, in order for the fuel cell vehicle 100C shown in FIG. 5 to perform initial driving sequence, the controller 180 generates control signals C5, C6, and C7, as shown in Table 3 below.

TABLE 3

| Operation Mode | C5 | C6 | C7 |
|---|---|---|---|
| OM1 | OFF | OFF | ON |
| OM2 | OFF | ON | OFF |

In a first operation mode OM1, the battery converter 162 boosts the voltage output from the battery 160, and provides the boosted voltage to the supercapacitor 150. To this end, as shown in Table 3, the fifth switching unit 193 and the sixth switching unit 195 are switched off (or turned off), and the seventh switching unit 197 is switched on (or turned on). Accordingly, a path indicated by the arrow A41 may be formed.

Thereafter, in a second operation mode OM2, the power stored in the supercapacitor 150 is provided to the stack driving unit 170 as driving power. To this end, as shown in Table 3, the fifth switching unit 193 and the seventh switching unit 197 are switched off, and the sixth switching unit 195 is switched on. Accordingly, a path indicated by the arrow A42 may be formed.

Finally, in order for the fuel cell vehicle 100D shown in FIG. 6 to perform initial driving sequence, the controller 180 generates control signals C5, C6, and C7, as shown in Table 4 below.

TABLE 4

| Operation Mode | C5 | C6 | C7 |
|---|---|---|---|
| OM1 | OFF | OFF | ON |
| OM2 | OFF | ON | OFF |

In a first operation mode OM1, the battery converter 162 boosts the voltage output from the battery 160, and provides the boosted voltage to the supercapacitor 150. To this end, as shown in Table 4, the fifth switching unit 193 and the sixth switching unit 195 are switched off (or turned off), and the seventh switching unit 197 is switched on (or turned on). Accordingly, a path indicated by the arrow A51 may be formed.

Thereafter, in a second operation mode OM2, the power stored in the supercapacitor 150 is provided to the stack driving unit 170 as driving power. To this end, as shown in Table 4, the fifth switching unit 193 and the seventh switching unit 197 are switched off, and the sixth switching unit 195 is switched on. Accordingly, a path indicated by the arrow A52 may be formed.

As shown in FIGS. 5 and 6, the boost converter 120 is a bidirectional converter in order to form the paths in the first and second operation modes OM1 and OM2.

Hereinafter, an operation method of each of the fuel cell vehicles 100A to 100D configured as described above from an initial state thereof to a steady state thereof will be described with reference to FIGS. 7 to 10. The following description will be given on the assumption that the initial driving sequence of each of the fuel cell vehicles 100A to 100D is performed in such a manner that driving power is generated in the battery converter 162 and is directly applied to the stack driving unit 170 without using the supercapacitor 150, but the embodiments are not limited thereto. That is, the following description may also apply to the case in which the initial driving sequence is performed as described above with reference to Tables 1 to 4.

FIGS. 7 to 10 are block diagrams for explaining operation methods of the fuel cell vehicles 100A to 100D shown in FIGS. 3 to 6.

Since the fuel cell vehicles shown in FIGS. 7 to 10 respectively have the same configurations as the fuel cell vehicles 100A to 100D shown in FIGS. 3 to 6, a duplicate description thereof will be omitted.

Figure 7:
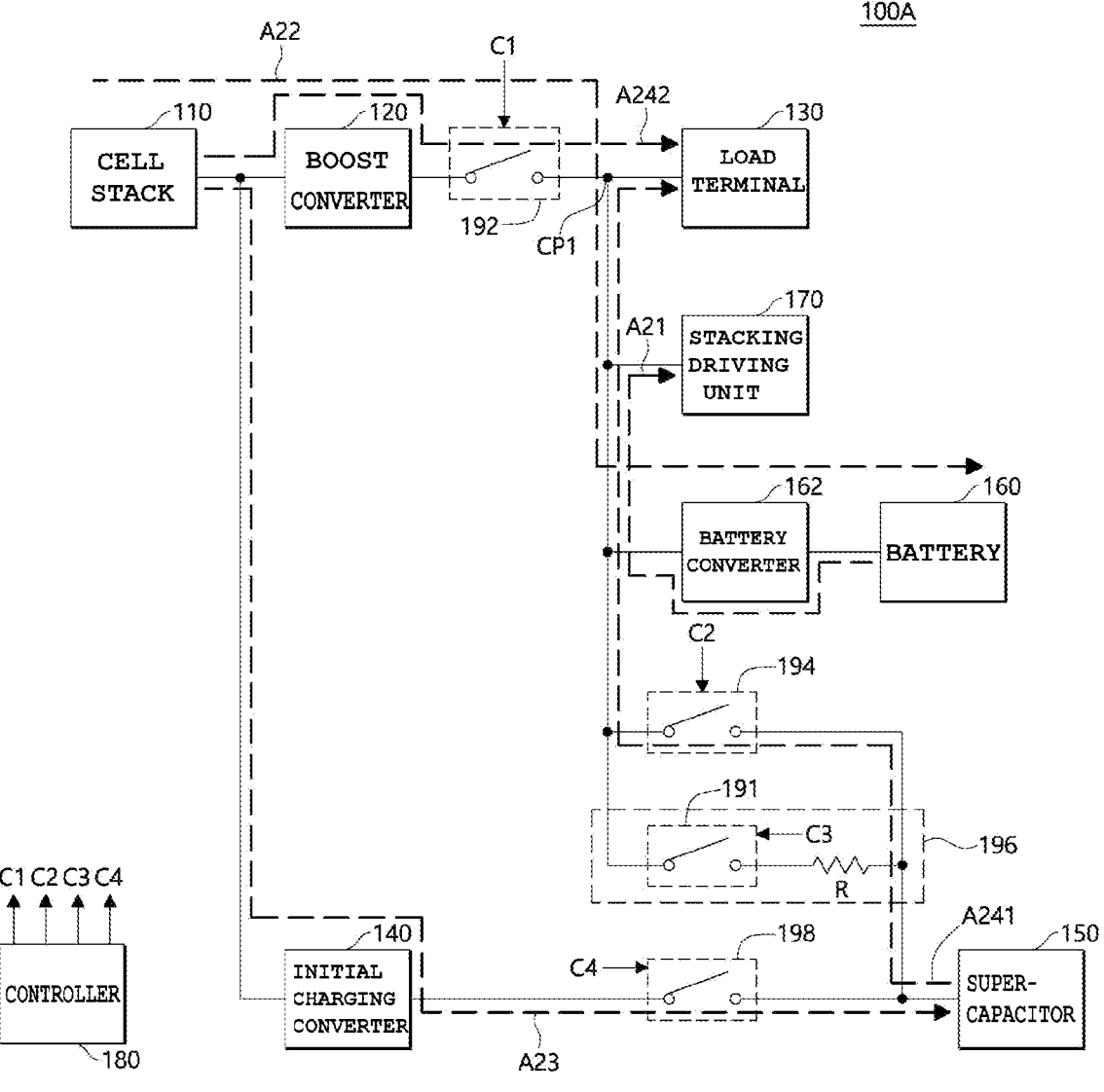
FIG. 7 is a block diagram for explaining an operation method of the fuel cell vehicle shown in FIG. 3.

First, the controller 180 generates control signals C1, C2, C3, and C4 for operation of the fuel cell vehicle 100A shown in FIG. 7, as shown in Table 5 below.

TABLE 5

| Operation Mode | C1 | C2 | C3 | C4 |
|---|---|---|---|---|
| OP1 | OFF | OFF | OFF | OFF |
| OP2 | OFF | OFF | OFF | OFF |
| OP3 | ON | OFF | OFF | OFF |
| OP4 | ON | OFF | OFF | OFF |
| OP5 | OFF | OFF | OFF | ON |
| OP6 | OFF | OFF | OFF | ON |
| OP7 | OFF | OFF | OFF | ON |
| OP8 | OFF | OFF | OFF | OFF |
| OP9 | ON | OFF | ON | OFF |
| OP10 | ON | ON | ON | OFF |
| OP11 | ON | ON | OFF | OFF |
| OP12 | ON | ON | OFF | OFF |

In a first operation mode OP1, the battery converter 162 boosts the voltage output from the battery 160, and outputs the boosted voltage to the stack driving unit 170 as driving power. To this end, as shown in Table 5, the first to fourth switching units 192, 194, 191, and 198 are switched off (or turned off). Accordingly, a path indicated by the arrow A21 may be formed.

Thereafter, in a second operation mode OP2, the air compressor of the stack driving unit 170 may be operated by the driving power applied thereto, whereby the cell stack 110 may start to generate power.

Thereafter, in a third operation mode OP3, as shown in Table 5, the first switching unit 192 is switched on (or turned on), and the other switching units 194, 191, and 198 are maintained in a switched-off state. Accordingly, a path indicated by the arrow A22 may be formed.

Thereafter, in a fourth operation mode OP4, the battery converter 162 reduces the stack voltage output from the cell stack 110 to recharge the battery 160. The power stored in the battery 160 is completely consumed in the first operation mode OP1, and then the battery 160 is recharged in the fourth operation mode OP4. It can be seen that the battery converter 162 is a bidirectional converter that boosts the voltage in the first operation mode OP1 and reduces the voltage in the fourth operation mode OP4.

Thereafter, operation of charging the supercapacitor 150 is performed through fifth to eighth operation modes OP5 to OP8, which will be described below.

That is, in a fifth operation mode OP5, the first switching unit 192 is switched off (or turned off), the fourth switching unit 198 is switched on (or turned on), and the second and third switching units 192 and 191 are maintained in a switched-off (or turned-off) state. Accordingly, a path indicated by the arrow A23 may be formed.

Thereafter, in a sixth operation mode OP6, the level of the stack voltage output from the cell stack 110 may be converted by the initial charging converter 140, and the power having the converted level may be stored in the supercapacitor 150.

Thereafter, a desired amount of power is charged in the supercapacitor 150, and then charging of the supercapacitor 150 is stopped in a seventh operation mode OP7.

Thereafter, in an eighth operation mode OP8, as shown in Table 5, the fourth switching unit 198 is switched off (or turned off).

Thereafter, in a ninth operation mode OP9, as shown in Table 5, the first switching unit 192 and the third switching unit 191 of the precharge terminal 196 are switched on (or turned on). The reason for this is to make the level of the stack voltage and the level of the capacitor voltage equal to each other, as described above.

Thereafter, when the level of the stack voltage and the level of the capacitor voltage become equal to each other, the second switching unit 194 is switched on (or turned on) in a tenth operation mode OP10, as shown in Table 5. Accordingly, a path indicated by the arrow A241 may be formed.

Thereafter, in an eleventh operation mode OP11, the third switching unit 191 is switched off (or turned off). Through the eleventh operation mode OP11, a process of preparing for operation of the fuel cell vehicle 100A, i.e. a preparation process for supplying at least one of the main power or the auxiliary power to the load terminal 130, is completed.

Accordingly, in a twelfth operation mode OP12, as indicated by the arrow A241, the auxiliary power may be provided to the load terminal 130, and as indicated by the arrow A242, the main power may be provided to the load terminal 130.

Figure 8:
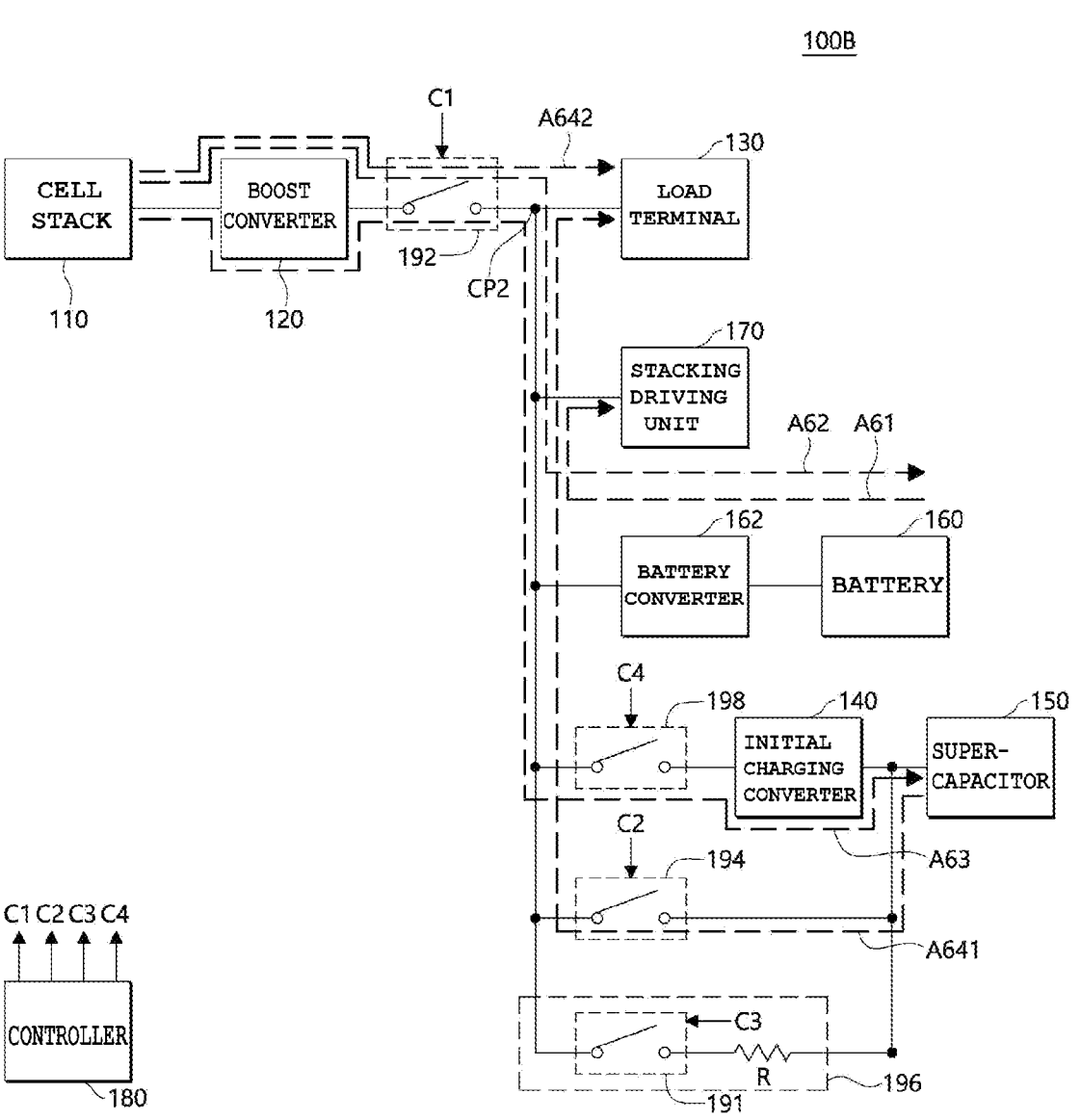
FIG. 8 is a block diagram for explaining an operation method of the fuel cell vehicle shown in FIG. 4.

Next, the controller 180 generates control signals C1, C2, C3, and C4 for operation of the fuel cell vehicle 100B shown in FIG. 8, as shown in Table 6 below.

TABLE 6

| Operation Mode | C1 | C2 | C3 | C4 |
|---|---|---|---|---|
| OP1 | OFF | OFF | OFF | OFF |
| OP2 | OFF | OFF | OFF | OFF |
| OP3 | ON | OFF | OFF | OFF |
| OP4 | ON | OFF | OFF | OFF |
| OP5 | ON | OFF | OFF | ON |
| OP6 | ON | OFF | OFF | ON |
| OP7 | ON | OFF | OFF | ON |
| OP8 | ON | OFF | OFF | OFF |
| OP9 | ON | OFF | ON | OFF |
| OP10 | ON | ON | ON | OFF |
| OP11 | ON | ON | OFF | OFF |
| OP12 | ON | ON | OFF | OFF |

In a first operation mode OP1, the battery converter 162 boosts the voltage output from the battery 160, and outputs the boosted voltage to the stack driving unit 170 as driving power. To this end, as shown in Table 6, the first to fourth switching units 192, 194, 191, and 198 are switched off (or turned off). Accordingly, a path indicated by the arrow A61 may be formed.

Thereafter, in a second operation mode OP2, the air compressor of the stack driving unit 170 may be operated by the driving power applied thereto, whereby the cell stack 110 may start to generate power.

Thereafter, in a third operation mode OP3, as shown in Table 6, the first switching unit 192 is switched on (or turned on), and the other switching units 194, 191, and 198 are maintained in a switched-off state. Accordingly, a path indicated by the arrow A62 may be formed.

Thereafter, in a fourth operation mode OP4, the battery converter 162 reduces the stack voltage VS output from the cell stack 110 to recharge the battery 160. The power stored in the battery 160 is completely consumed in the first operation mode OP1, and then the battery 160 is recharged in the fourth operation mode OP4. It can be seen that the battery converter 162 is a bidirectional converter that boosts the voltage in the first operation mode OP1 and reduces the voltage in the fourth operation mode OP4.

Thereafter, operation of charging the supercapacitor 150 is performed through fifth to eighth operation modes OP5 to OP8, which will be described below.

That is, in a fifth operation mode OP5, in the state in which the first switching unit 192 is switched on (or turned on), the fourth switching unit 198 is switched on (or turned on), and the second and third switching units 192 and 191 are maintained in a switched-off (or turned-off) state. Accordingly, a path indicated by the arrow A63 may be formed.

Thereafter, in a sixth operation mode OP6, the level of the stack voltage output from the cell stack 110 may be converted by the initial charging converter 140, and the power having the converted level may be stored in the supercapacitor 150.

Thereafter, a desired amount of power is charged in the supercapacitor 150, and then charging of the supercapacitor 150 is stopped in a seventh operation mode OP7.

Thereafter, in an eighth operation mode OP8, as shown in Table 6, the fourth switching unit 198 is switched off (or turned off).

Thereafter, in a ninth operation mode OP9, as shown in Table 6, in the state in which the first switching unit 192 is switched on (or turned on), the third switching unit 191 of the precharge terminal 196 is switched on (or turned on). The reason for this is to make the level of the stack voltage and the level of the capacitor voltage equal to each other, as described above.

Thereafter, when the level of the stack voltage and the level of the capacitor voltage become equal to each other, the second switching unit 194 is switched on (or turned on) in a tenth operation mode OP10, as shown in Table 6. Accordingly, a path indicated by the arrow A641 may be formed.

Thereafter, in an eleventh operation mode OP11, the third switching unit 191 is switched off (or turned off). Through the eleventh operation mode OP11, a process of preparing for operation of the fuel cell vehicle 100B is completed.

Accordingly, in a twelfth operation mode OP12, as indicated by the arrow A641, the auxiliary power may be provided to the load terminal 130, and as indicated by the arrow A642, the main power may be provided to the load terminal 130.

Figure 9:
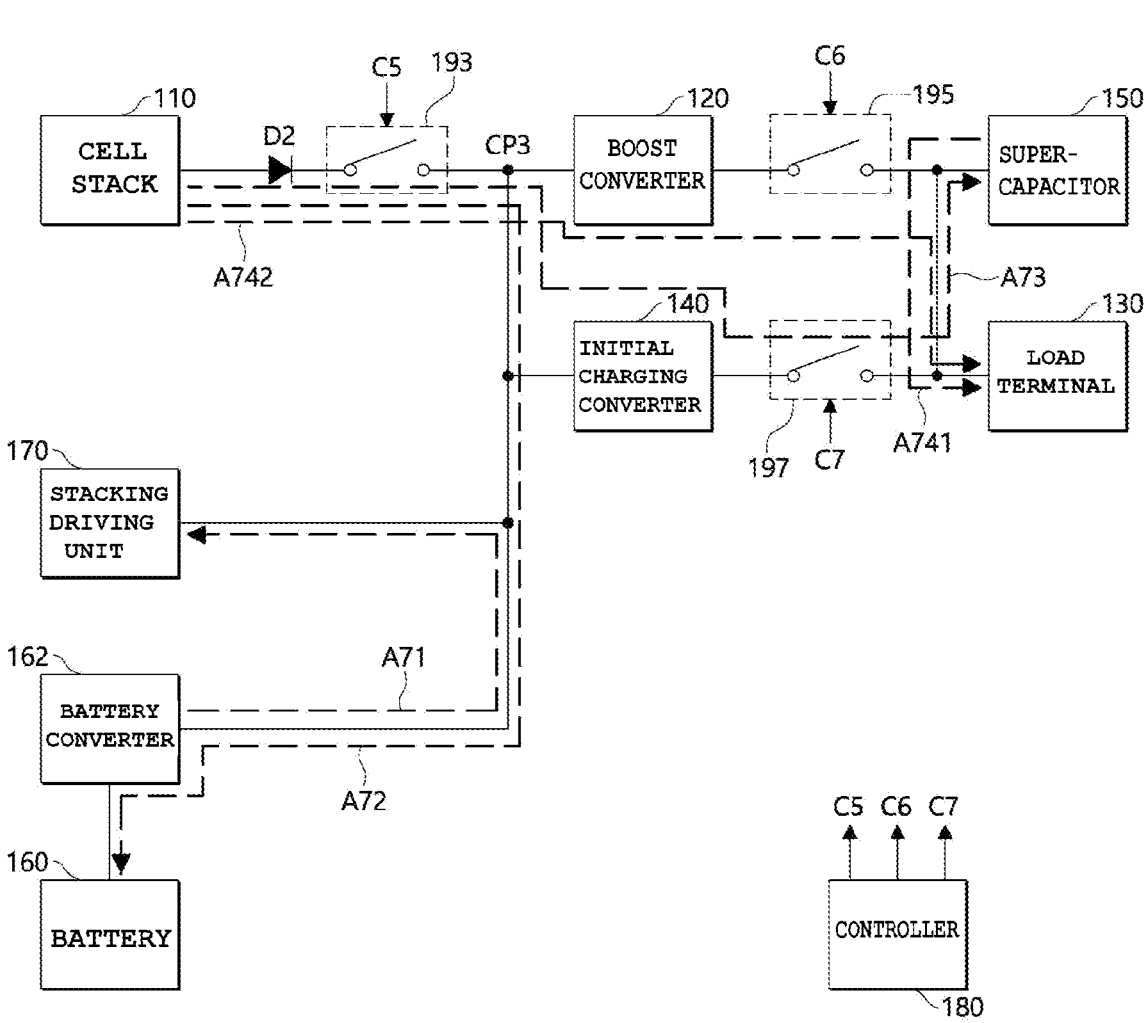
FIG. 9 is a block diagram for explaining an operation method of the fuel cell vehicle shown in FIG. 5.

Next, the controller 180 generates control signals C5, C6, and C7 for operation of the fuel cell vehicle 100C shown in FIG. 9, as shown in Table 7 below.

TABLE 7

| Operation Mode | C5 | C6 | C7 |
|---|---|---|---|
| OP1 | OFF | OFF | OFF |
| OP2 | OFF | OFF | OFF |
| OP3 | ON | OFF | OFF |
| OP4 | ON | OFF | OFF |
| OP5 | ON | OFF | ON |
| OP6 | ON | OFF | ON |
| OP7 | ON | OFF | ON |
| OP8 | ON | OFF | OFF |

TABLE 7-continued

| Operation Mode | C5 | C6 | C7 |
|---|---|---|---|
| OP9 | ON | ON | OFF |
| OP10 | ON | ON | OFF |

In a first operation mode OP1, the battery converter 162 boosts the voltage output from the battery 160, and outputs the boosted voltage to the stack driving unit 170 as driving power. To this end, as shown in Table 7, the fifth to seventh switching units 193, 195, and 197 are switched off (or turned off). Accordingly, a path indicated by the arrow A71 may be formed.

Thereafter, in a second operation mode OP2, the air compressor of the stack driving unit 170 may be operated by the driving power applied thereto, whereby the cell stack 110 may start to generate power.

Thereafter, in a third operation mode OP3, as shown in Table 7, the fifth switching unit 193 is switched on (or turned on), and the other switching units 195 and 197 are maintained in a switched-off state. Accordingly, a path indicated by the arrow A72 may be formed.

Thereafter, in a fourth operation mode OP4, the battery converter 162 reduces the stack voltage output from the cell stack 110 to recharge the battery 160. The power stored in the battery 160 is completely consumed in the first operation mode OP1, and then the battery 160 is recharged in the fourth operation mode OP4. It can be seen that the battery converter 162 is a bidirectional converter that boosts the voltage in the first operation mode OP1 and reduces the voltage in the fourth operation mode OP4.

Thereafter, operation of charging the supercapacitor 150 is performed through fifth to eighth operation modes OP5 to OP8, which will be described below.

That is, in a fifth operation mode OP5, in the state in which the fifth switching unit 193 is switched on (or turned on), the seventh switching unit 197 is switched on (or turned on), and the sixth switching unit 195 is maintained in a switched-off (or turned-off) state. Accordingly, a path indicated by the arrow A73 may be formed.

Thereafter, in a sixth operation mode OP6, the level of the stack voltage output from the cell stack 110 may be converted by the initial charging converter 140, and the power having the converted level may be stored in the supercapacitor 150.

Thereafter, a desired amount of power is charged in the supercapacitor 150, and then charging of the supercapacitor 150 is stopped in a seventh operation mode OP7.

Thereafter, in an eighth operation mode OP8, as shown in Table 7, the seventh switching unit 197 is switched off (or turned off).

Thereafter, in a ninth operation mode OP9, as shown in Table 7, the sixth switching unit 195 is switched on (or turned on). Through the ninth operation mode OP9, a process of preparing for operation of the fuel cell vehicle 100C is completed.

Accordingly, in a tenth operation mode OP10, as indicated by the arrow A741, the auxiliary power may be provided to the load terminal 130, and as indicated by the arrow A742, the main power may be provided to the load terminal 130.

Figure 10:
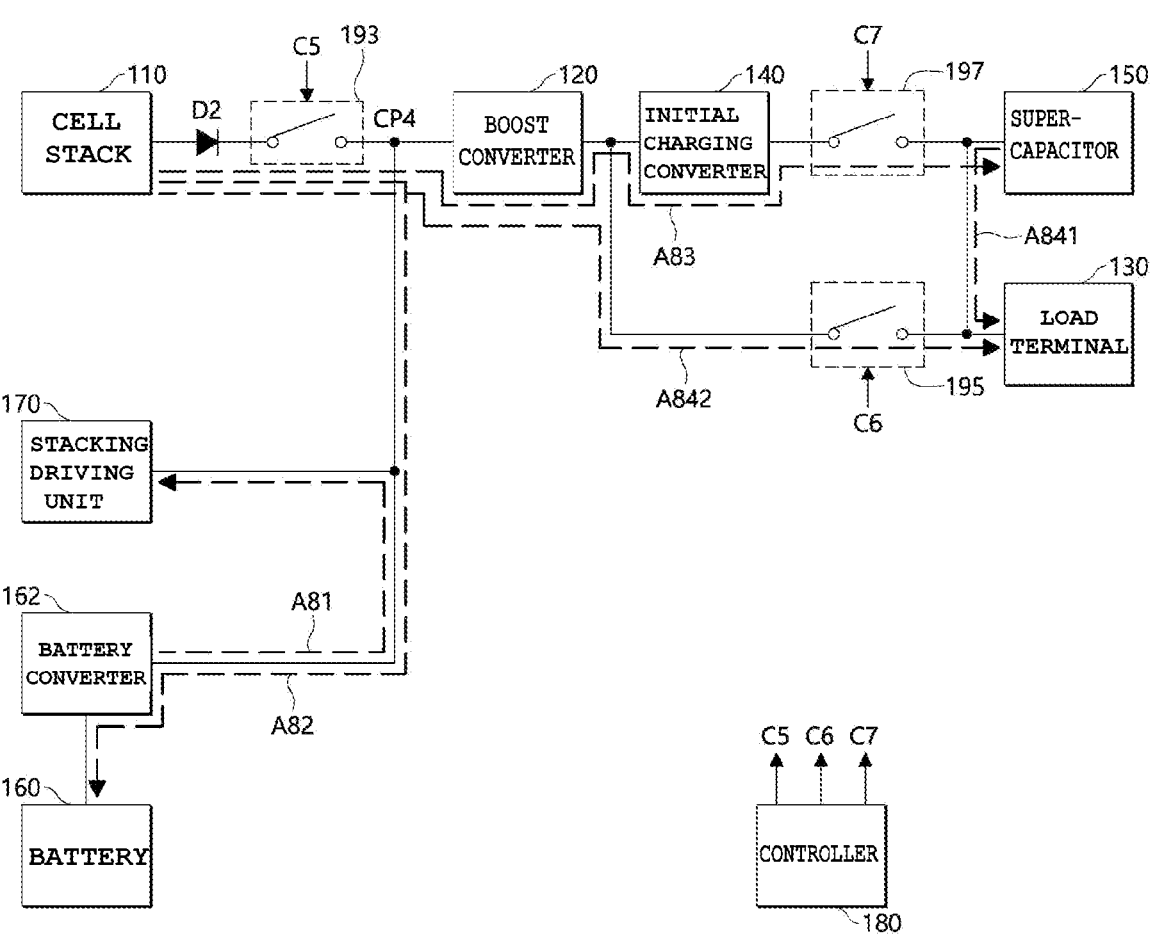
FIG. 10 is a block diagram for explaining an operation method of the fuel cell vehicle shown in FIG. 6.

Next, the controller 180 generates control signals C5, C6, and C7 for operation of the fuel cell vehicle 100D shown in FIG. 10, as shown in Table 8 below.

TABLE 8

| Operation Mode | C5 | C6 | C7 |
|---|---|---|---|
| OP1 | OFF | OFF | OFF |
| OP2 | OFF | OFF | OFF |
| OP3 | ON | OFF | OFF |
| OP4 | ON | OFF | OFF |
| OP5 | ON | OFF | ON |
| OP6 | ON | OFF | ON |
| OP7 | ON | OFF | ON |
| OP8 | ON | OFF | OFF |
| OP9 | ON | ON | OFF |
| OP10 | ON | ON | OFF |

In a first operation mode OP1, the battery converter 162 boosts the voltage output from the battery 160, and outputs the boosted voltage to the stack driving unit 170 as driving power. To this end, as shown in Table 8, the fifth to seventh switching units 193, 195, and 197 are switched off (or turned off). Accordingly, a path indicated by the arrow A81 may be formed.

Thereafter, in a second operation mode OP2, the air compressor of the stack driving unit 170 may be operated by the driving power applied thereto, whereby the cell stack 110 may start to generate power.

Thereafter, in a third operation mode OP3, as shown in Table 8, the fifth switching unit 193 is switched on (or turned on), and the other switching units 195 and 197 are maintained in a switched-off state. Accordingly, a path indicated by the arrow A82 may be formed.

Thereafter, in a fourth operation mode OP4, the battery converter 162 reduces the stack voltage output from the cell stack 110 to recharge the battery 160. The power stored in the battery 160 is completely consumed in the first operation mode OP1, and then the battery 160 is recharged in the fourth operation mode OP4. It can be seen that the battery converter 162 is a bidirectional converter that boosts the voltage in the first operation mode OP1 and reduces the voltage in the fourth operation mode OP4.

Thereafter, operation of charging the supercapacitor 150 is performed through fifth to eighth operation modes OP5 to OP8, which will be described below.

That is, in a fifth operation mode OP5, in the state in which the fifth switching unit 193 is switched on (or turned on), the seventh switching unit 197 is switched on (or turned on), and the sixth unit 195 is switching maintained in a switched-off (or turned-off) state. Accordingly, a path indicated by the arrow A83 may be formed.

Thereafter, in a sixth operation mode OP6, the level of the voltage output from the boost converter 120 may be converted by the initial charging converter 140, and the power having the converted level may be stored in the supercapacitor 150.

Thereafter, a desired amount of power is charged in the supercapacitor 150, and then charging of the supercapacitor 150 is stopped in a seventh operation mode OP7.

Thereafter, in an eighth operation mode OP8, as shown in Table 8, the seventh switching unit 197 is switched off (or turned off).

Thereafter, in a ninth operation mode OP9, as shown in Table 8, the sixth switching unit 195 is switched on (or turned on). Through the ninth operation mode OP9, a process of preparing for operation of the fuel cell vehicle 100D is completed.

Accordingly, in a tenth operation mode OP10, as indicated by the arrow A841, the auxiliary power may be provided to the load terminal 130, and as indicated by the arrow A842, the main power may be provided to the load terminal 130.

Hereinafter, a comparative example and the fuel cell vehicles according to the embodiments will be described with reference to the accompanying drawings.

Figures 11, 12:
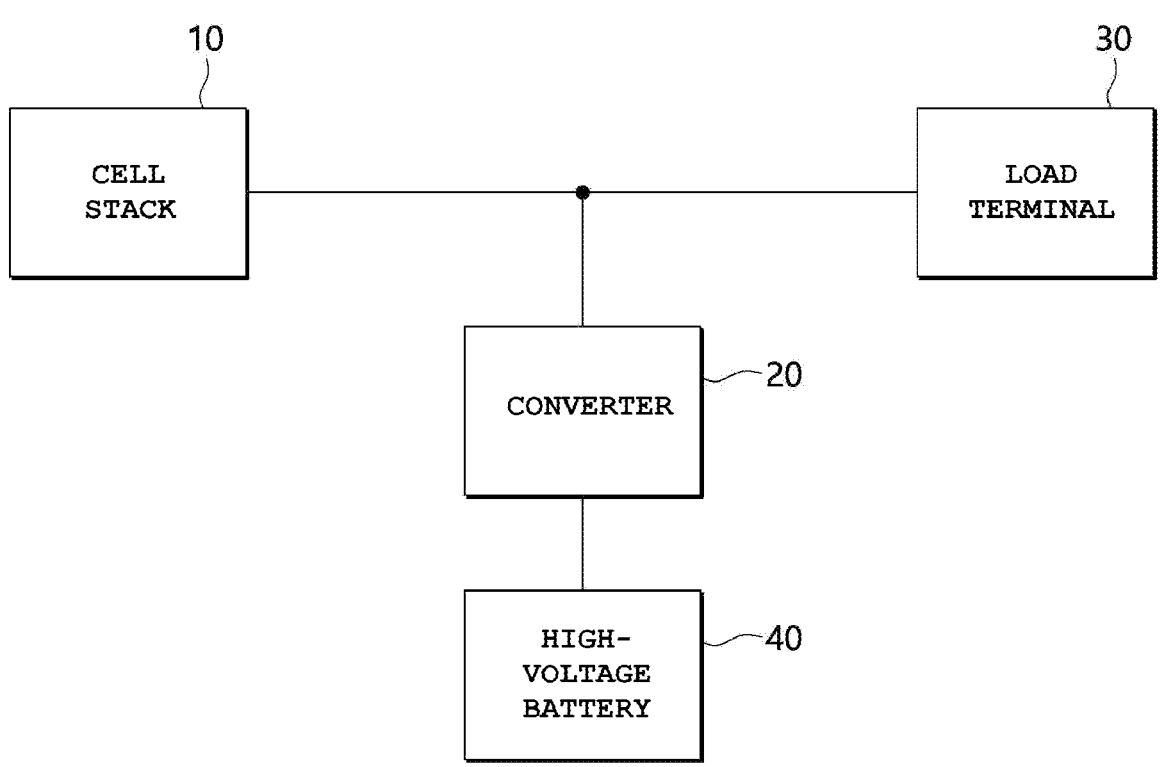
FIG. 11 is a block diagram showing an example of a fuel cell vehicle according to a comparative example.
FIG. 12 is a block diagram showing another example of the fuel cell vehicle according to the comparative example.

FIG. 11 is a block diagram showing an example of a fuel cell vehicle according to a comparative example. The fuel cell vehicle according to the comparative example may include a cell stack 10, a converter 20, a load terminal 30, and a high-voltage battery 40.

The cell stack 10, the converter 20, and the load terminal 30 respectively perform the same functions as the cell stack 110, the boost converter 120, and the load terminal 130 shown in FIG. 1, and thus duplicate description thereof will be omitted.

The load terminal 30 is driven by the main power generated in the cell stack 10. In this case, the high-voltage battery 40 stores auxiliary power and provides the same to the load terminal 30 when necessary. For example, the auxiliary power compensates for delay in the power generation response time of a fuel cell system (or power module complete (PMC)) including the cell stack 10, is added to the main power when the PMC requires high output, or is supplied to the load terminal 30 instead of the main power when the PMC malfunctions. The fuel cell vehicles according to the embodiments employ the supercapacitor 150 in place of the high-voltage battery 40, and thus exhibit the effects that the supercapacitor 150 has in comparison with the high-voltage battery 40.

The supercapacitor 150 according to the above-described embodiments performs a function similar to that of the high-voltage battery 40 shown in FIG. 11. However, the supercapacitor 150 according to the embodiments has various advantages compared to the high-voltage battery 40 according to the comparative example. That is, the supercapacitor 150 is capable of storing regenerative energy generated rapidly during regenerative braking of the fuel cell vehicle, and is capable of discharging a large amount of energy during instantaneous high output of the fuel cell vehicle. In addition, the supercapacitor 150 has high durability against frequent charging/discharging, and has a compact structure. In addition, the production costs of the supercapacitor 150 are low and thus the supercapacitor 150 has a competitive price.

In general, the fuel cell including the cell stack 10 has a characteristic in which voltage decreases as output increases. Considering this, as voltage increases and current decreases at the same output, loss decreases, and efficiency increases. When the stack voltage generated in the cell stack 10 is directly supplied to the load terminal 30, efficiency may decrease as the output of the fuel cell vehicle increases.

In addition, because the converter 20 is located on a path through which power is supplied to the high-voltage battery 40 through the load terminal 30 during regenerative braking, charging/discharging efficiency may be lowered.

Further, when the converter 20 malfunctions, it is difficult for the regenerative braking energy provided from the load terminal 30 to be stored in the high-voltage battery 40, and thus other components such as the fuel cell may be thermally damaged.

FIG. 12 is a block diagram showing another example of the fuel cell vehicle according to the comparative example, which includes a cell stack 10, a load terminal 30, and a supercapacitor 50.

The cell stack 10 and the load terminal 30 shown in FIG. 12 respectively perform the same functions as the cell stack

10 and the load terminal 30 shown in FIG. 11, and thus the same reference numerals are assigned to the same components, and a duplicate description thereof will be omitted.

In addition, the supercapacitor 50 shown in FIG. 12 plays a role of the high-voltage battery 40 shown in FIG. 11. Since the fuel cell vehicle according to the comparative example shown in FIG. 12 employs the supercapacitor 50 in place of the high-voltage battery 40, the same exhibits improved effects compared to the fuel cell vehicle including the high-voltage battery 40 shown in FIG. 11. However, in the case of the fuel cell vehicles according to the comparative examples shown in FIGS. 11 and 12, the power generated in the cell stack 10 is directly applied to the load terminal 30. In particular, in the case of the fuel cell vehicle according to the comparative example shown in FIG. 11, the power generated in the cell stack 10 is directly applied to the load terminal 30, not via the converter 20.

Further, in the case of the configuration shown in FIG. 12, because the cell stack 10 and the supercapacitor 50 are directly connected to each other, when power is supplied to the load terminal 30, it may be difficult to freely distribute the power generated in the cell stack 10 and the power charged in the supercapacitor 50.

In contrast, in the case of the fuel cell vehicles 100A, 100B, 100C, and 100D according to the embodiments, the boost converter 120 is located between the cell stack 110 and the load terminal 130. Therefore, the main power and the auxiliary power are appropriately distributed and supplied to the load terminal 130. That is, it is possible to control the power transmitted to the load terminal 130 from the cell stack 110 using the boost converter 120 and to compensate for the shortage of power by supplying the auxiliary power charged in the supercapacitor 150 to the load terminal 130.

For example, in the case of the comparative example shown in FIG. 12, when the load terminal 30 requires energy of 100, the supercapacitor 50 needs to supply the entirety of energy of 100 to the load terminal 30, or the cell stack 10 needs to supply the entirety of energy of 100 to the load terminal 30.

In contrast, in the case of the embodiments, when the load terminal 130 requires energy of 100, the cell stack 110 may supply energy of 20 to the load terminal 130 through the boost converter 120, and the supercapacitor 150 may supply energy of 80 to the load terminal 130. Alternatively, when the load terminal 130 requires energy of 100, the cell stack 110 may supply energy of 80 to the load terminal 130 through the boost converter 120, and the supercapacitor 150 may supply energy of 20 to the load terminal 130.

Accordingly, according to the embodiments, the states of the cell stack 110 and the supercapacitor 150 may be monitored, and power distribution may be controlled based on the result of monitoring so as to achieve the most efficient and stable energy distribution for each travel situation of the fuel cell vehicle.

As is apparent from the above description, the fuel cell vehicle according to the embodiment employs the supercapacitor in place of a high-voltage battery. Accordingly, the supercapacitor may store regenerative energy generated rapidly during regenerative braking of the fuel cell vehicle, and may discharge a large amount of energy during instantaneous high output of the fuel cell vehicle. In addition, the supercapacitor may have high durability against frequent charging/discharging, and may have a compact structure. In addition, the production costs of the supercapacitor may be reduced, and thus the supercapacitor may have a competitive price. In addition, the main power and the auxiliary power may be appropriately distributed and supplied to the load terminal. Accordingly, the states of the cell stack and the supercapacitor may be monitored, and power distribution may be controlled based on the result of monitoring so as to achieve the most efficient and stable energy distribution for each travel situation of the fuel cell vehicle.

However, the effects achievable through the disclosure are not limited to the above-mentioned effects, and other effects not mentioned herein will be clearly understood by those skilled in the art from the above description.

The above-described various embodiments may be combined with each other without departing from the scope of the present disclosure unless they are incompatible with each other.

In addition, for any element or process that is not described in detail in any of the various embodiments, reference may be made to the description of an element or a process having the same reference numeral in another embodiment, unless otherwise specified.

While the present disclosure has been particularly shown and described with reference to exemplary embodiments thereof, these embodiments are only proposed for illustrative purposes, and do not restrict the present disclosure, and it will be apparent to those skilled in the art that various changes in form and detail may be made without departing from the essential characteristics of the embodiments set forth herein. For example, respective configurations set forth in the embodiments may be modified and applied. Further, differences in such modifications and applications should be construed as falling within the scope of the present disclosure as defined by the appended claims.

What is claimed is:

1. A fuel cell power system for a vehicle, comprising:
a cell stack comprising a plurality of unit cells stacked on one another;
a boost converter configured to boost an output from the cell stack and to output the boosted output as main power;
a supercapacitor configured to be charged with power generated in the cell stack to generate auxiliary power;
a load terminal connected to the boost converter and the supercapacitor instead of the cell stack, the load terminal being configured to receive the main power from the boost converter and to receive the auxiliary power from the supercapacitor;
a battery;
a battery converter configured to boost voltage output from the battery and provide the boosted voltage to the supercapacitor; and
an initial charging converter configured to convert a level of power generated in the cell stack into a converted level of power and to provide the converted level of power to the supercapacitor,
wherein the initial charging converter is configured to operate as a buck converter or a boost converter depending on a magnitude of a capacitor voltage charged in the supercapacitor and a magnitude of a voltage input to the initial charging converter.

2. The fuel cell power system according to claim 1, wherein the initial charging converter directly receives the power generated in the cell stack.

3. The fuel cell power system according to claim 1, wherein the initial charging converter converts a level of an output power from the boost converter into a converted level of power and provides the converted level of power to the supercapacitor.

4. The fuel cell power system according to claim 1, further comprising:
a stack driving unit configured to drive the cell stack to generate power in response to driving power.

5. The fuel cell power system according to claim 4, wherein power having a level corresponding to the voltage boosted by the battery converter is equal to or less than an average value of the driving power.

6. The fuel cell power system according to claim 5, wherein the supercapacitor is charged with power corresponding to the voltage boosted by the battery converter to generate the driving power.

7. The fuel cell power system according to claim 4, wherein the initial charging converter is disposed between the cell stack and the supercapacitor so as to be connected thereto.

8. The fuel cell power system according to claim 4, wherein the initial charging converter is disposed between the boost converter and the supercapacitor so as to be connected thereto.

9. The fuel cell power system according to claim 7, further comprising:
a first switching unit disposed between the boost converter and the load terminal so as to be selectively connected thereto;
a second switching unit disposed between the first switching unit and the supercapacitor so as to be selectively connected thereto;
a precharge terminal connected in parallel to the second switching unit and comprising a third switching unit and a resistor connected to each other in series;
a fourth switching unit disposed between the initial charging converter and the supercapacitor so as to selectively be connected thereto; and
a controller configured to control a switching operation for each of the first switching unit through the fourth switching unit, respectively.

10. The fuel cell power system according to claim 8, further comprising:
a first switching unit disposed between the boost converter and the load terminal so as to be selectively connected thereto;
a second switching unit disposed between the first switching unit and the supercapacitor so as to be selectively connected thereto;
a precharge terminal connected in parallel to the second switching unit and comprising a third switching unit and a resistor connected to each other in series;
a fourth switching unit disposed between the first switching unit and the initial charging converter so as to be selectively connected thereto; and
a controller configured to control a switching operation for each of the first switching unit through the fourth switching unit, respectively.

11. The fuel cell power system according to claim 9, wherein each of the battery converter and the stack driving unit is connected to a contact point between the first switching unit and the second switching unit and to a contact point between the first switching unit and the precharge terminal.

12. The fuel cell power system according to claim 10, wherein each of the battery converter and the stack driving unit is connected to a contact point between the first switching unit and the fourth switching unit and to a contact point between the first switching unit and the second switching unit.

13. The fuel cell power system according to claim 7, further comprising:

a fifth switching unit disposed between the cell stack and the boost converter so as to be selectively connected thereto;

a sixth switching unit disposed between the boost converter and the supercapacitor and between the boost converter and the load terminal so as to be selectively connected thereto;

a seventh switching unit disposed between the initial charging converter and the supercapacitor and between the initial charging converter and the load terminal so as to be selectively connected thereto; and a controller configured to control a switching operation for each of the fifth switching unit through the seventh switching unit, respectively.

14. The fuel cell power system according to claim 13, wherein each of the battery converter and the stack driving unit is connected to a contact point between the fifth switching unit and the boost converter and to a contact point between the fifth switching unit and the initial charging converter.

15. The fuel cell power system according to claim 13, wherein each of the battery converter and the stack driving unit is connected to a contact point between the fifth switching unit and the boost converter.

16. A fuel cell power system for a vehicle, comprising:

a cell stack comprising a plurality of unit cells stacked on one another;

a boost converter configured to boost an output from the cell stack and to output the boosted output as main power;

a supercapacitor configured to be charged with power generated in the cell stack to generate auxiliary power;

a load terminal connected to the boost converter and the supercapacitor, the load terminal being configured to receive the main power from the boost converter and to receive the auxiliary power from the supercapacitor;

a first switching unit disposed between the boost converter and the load terminal so as to be selectively connected thereto;

an initial charging converter disposed between the cell stack and the supercapacitor so as to be connected thereto, the initial charger converter being configured to convert a level of power generated in the cell stack into a converted level of power and to provide the converted level of power to the supercapacitor;

a battery;

a stack driving unit configured to drive the cell stack to generate power in response to driving power;

a battery converter configured to boost voltage output from the battery and being connected to the stack driving unit;

a second switching unit disposed: (a) between the load terminal and the supercapacitor, (b) between the stack driving unit and the supercapacitor, and (c) between the battery converter and the supercapacitor so as to be selectively connected thereto;

a precharge terminal connected in parallel to the second switching unit and comprising a third switching unit and a resistor connected to each other in series; and a fourth switching unit disposed between the initial charging converter and the cell stack so as to be selectively connected thereto or disposed between the initial charging converter and the supercapacitor so as to be selectively connected thereto.

17. A fuel cell power system for a vehicle, comprising:

a cell stack comprising a plurality of unit cells stacked on one another;

a boost converter configured to boost an output from the cell stack and to output the boosted output as main power;

a supercapacitor configured to be charged with power generated in the cell stack to generate auxiliary power;

a load terminal connected to the boost converter and the supercapacitor, the load terminal being configured to receive the main power from the boost converter and to receive the auxiliary power from the supercapacitor;

an initial charging converter disposed between the boost converter and the supercapacitor so as to be connected thereto and being configured to convert a level of an output from the boost converter and to provide the output having the converted level to the supercapacitor;

a first switching unit disposed between the boost converter and the load terminal so as to be selectively connected thereto;

a battery;

a stack driving unit configured to drive the cell stack to generate power in response to driving power;

a battery converter configured to boost voltage output from the battery and being connected to the stack driving unit;

a second switching unit disposed between: (a) the load terminal and the supercapacitor and (b) between the stack driving unit and the supercapacitor so as to be selectively connected thereto;

a precharge terminal connected in parallel to the second switching unit and comprising a third switching unit and a resistor connected to each other in series; and a fourth switching unit disposed between: (a) the first switching unit and the initial charging converter and (b) between the battery converter and the initial charging converter so as to be selectively connected thereto or disposed between the initial charging converter and the supercapacitor so as to be selectively connected thereto.

* * * * *